US012579921B2

(12) United States Patent
Kim

(10) Patent No.: US 12,579,921 B2
(45) Date of Patent: Mar. 17, 2026

(54) ELECTRONIC DEVICE HAVING FLEXIBLE DISPLAY AND METHOD FOR CONTROLLING THE SAME

(71) Applicant: SAMSUNG ELECTRONICS CO., LTD., Suwon-si (KR)

(72) Inventor: Yein Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 18/399,412

(22) Filed: Dec. 28, 2023

(65) Prior Publication Data

US 2024/0290234 A1　Aug. 29, 2024

Related U.S. Application Data

(63) Continuation of application No. PCT/KR2023/015715, filed on Oct. 12, 2023.

(30) Foreign Application Priority Data

Oct. 12, 2022　(KR) ........................ 10-2022-0130561
Dec. 1, 2022　(KR) ........................ 10-2022-0165942

(51) Int. Cl.
　*G09G 3/00*　(2006.01)
　*G06F 1/16*　(2006.01)
　*G06F 40/174*　(2020.01)

(52) U.S. Cl.
　CPC .......... *G09G 3/035* (2020.08); *G06F 1/1652* (2013.01); *G06F 40/174* (2020.01); *G09G 2340/145* (2013.01); *G09G 2354/00* (2013.01)

(58) Field of Classification Search
　CPC ............. G09G 3/035; G09G 2340/145; G09G 2354/00; G06F 1/1652; G06F 40/174;
(Continued)

(56) References Cited

U.S. PATENT DOCUMENTS 10,114,418 B2　10/2018　Shin et al.
11,698,705 B2　7/2023　Kim et al.
(Continued)

FOREIGN PATENT DOCUMENTS

CN　108037869 A　5/2018
EP　4 216 046 A1　7/2023
(Continued)

OTHER PUBLICATIONS

PCT International Search Report dated Jan. 15, 2024 for PCT Application No. PCT/KR2023/015715.
(Continued)

*Primary Examiner* — King Y Poon
*Assistant Examiner* — Patrick P Galera
(74) *Attorney, Agent, or Firm* — Nixon & Vanderhye P.C.

(57) ABSTRACT

An electronic device may include a housing including a first housing part and a second housing part configured to movably engage with the first housing part between a retracted position and an extended position, a flexible display coupled to the first housing part and the second housing part such that a size of an area of the flexible display that is visible from a front side of the housing changes as the second housing part is moved between the retracted position and the extended position, a processor, and a memory storing instructions that, when executed by the processor, cause the electronic device to while the second housing part is in the extended position, display, on a first area of the flexible display visible from the front side, a first message bubble and a second message bubble, while the first message bubble and the second message bubble are displayed on the flexible display, identify that the second housing part is moved from the extended position to the retracted position, and based on the second housing part being moved from the extended position to the retracted position, display, on a second area
(Continued)

[a]

[b]

of the flexible display visible from the front side, a combined message bubble by including a content of the first message bubble and a content of the second message bubble, wherein a size of the second area of the flexible display is smaller than a size of the first area of the flexible display.

20 Claims, 22 Drawing Sheets

(58) Field of Classification Search
CPC .......... G06F 1/16; G06F 1/1624; G06F 3/041; G06F 3/0481; G06F 3/04842; H04M 1/02; H04M 1/72436; H04M 1/72454
See application file for complete search history.

(56) References Cited

U.S. PATENT DOCUMENTS

| | | | |
|---|---|---|---|
| 2016/0349971 A1 | 12/2016 | Chi et al. | |
| 2017/0061932 A1 | 3/2017 | Kwon et al. | |
| 2019/0261519 A1* | 8/2019 | Park | H04M 1/0235 |
| 2019/0334844 A1* | 10/2019 | Le Huerou | G06F 16/287 |
| 2022/0407955 A1 | 12/2022 | Kim et al. | |
| 2023/0403245 A1* | 12/2023 | Chen | H04L 51/214 |

FOREIGN PATENT DOCUMENTS

| | | | |
|---|---|---|---|
| KR | 10-2018-0031373 A | 3/2018 |
| KR | 20190038516 A | 4/2019 |
| KR | 20210151675 A | 12/2021 |
| KR | 102359550 B1 | 2/2022 |
| KR | 10-2022-0061797 A | 5/2022 |
| KR | 10-2022-0064024 A | 5/2022 |
| KR | 10-2022-0082014 A | 6/2022 |
| WO | 2022050437 A1 | 3/2022 |
| WO | WO 2024/080779 A1 | 4/2024 |

OTHER PUBLICATIONS

PCT Notice of Publication dated Apr. 18, 2024 for PCT/KR2023/015715.

* cited by examiner

ELECTRONIC DEVICE HAVING FLEXIBLE DISPLAY AND METHOD FOR CONTROLLING THE SAME

CROSS-REFERENCE TO RELATED APPLICATIONS

This application is a continuation of International Application No. PCT/KR2023/015715 filed on Oct. 12, 2023, designating the United States, in the Korean Intellectual Property Receiving Office, and claiming priority to KR Patent Application No. 10-2022-0130561 filed on Oct. 12, 2022 and KR Patent Application No. 10-2022-0165942 filed on Dec. 1, 2022, in the Korean Intellectual Property Office, the disclosures of all of which are hereby incorporated by reference herein in their entireties.

BACKGROUND

Field

Various example embodiments relate to an electronic device comprising a flexible display, and/or a method for controlling the same.

Description of Related Art

With the development of technology, an electronic device having a flexible display is being introduced.

A flexible display is a display having a deformable shape, and an electronic device having a flexible display, for example, as a foldable or rollable electronic device, may include a foldable or rollable housing. In the electronic device having such a flexible display, a display region of the flexible display may be expanded or reduced according to the folding or sliding of the housing.

SUMMARY

Various example embodiments implement various user interfaces in an electronic device having a flexible display, according to a change in size of the display that is expanded and/or reduced.

An electronic device according to various example embodiments may include a housing including a first housing part and a second housing part configured to movably engage with the first housing part between a retracted position and an extended position, a flexible display coupled to the first housing part and the second housing part such that a size of an area of the flexible display that is visible from a front side of the housing changes as the second housing part is moved between the retracted position and the extended position, a processor, and a memory storing instructions that, when executed by the processor, cause the electronic device to while the second housing part is in the extended position, display, on a first area of the flexible display visible from the front side, a first message bubble and a second message bubble, while the first message bubble and the second message bubble are displayed on the flexible display, identify that the second housing part is moved from the extended position to the retracted position, and based on the second housing part being moved from the extended position to the retracted position, display, on a second area of the flexible display visible from the front side, a combined message bubble by including a content of the first message bubble and a content of the second message bubble, wherein a size of the second area of the flexible display is smaller than a size of the first area of the flexible display.

A method performed by an electronic device having a housing including a first housing part and a second housing part configured to movably engage with the first housing part between a retracted position and an extended position according to various example embodiments may include while the second housing part is in the extended position, displaying, on a first area of a flexible display of the electronic device visible from a front side of the housing, a first message bubble and a second message bubble, while the first message bubble and the second message bubble are displayed on the flexible display, identifying that the second housing part is moved from the extended position to the retracted position, and based on the second housing part being moved from the extended position to the retracted position, displaying, on a second area of the flexible display visible from the front side, a combined message bubble by including a content of the first message bubble and a content of the second message bubble, wherein a size of the second area of the flexible display is smaller than a size of the first area of the flexible display.

Technical problems, technical characteristics, and effects to be achieved are not limited to the above-described technical problems, and any other technical problems, technical characteristics, and effects not mentioned herein will be clearly understood from the following description by those skilled in the art to which the disclosure pertains.

BRIEF DESCRIPTION OF DRAWINGS

In connection with the description of the drawings, the same or similar reference numerals may be used for the same or similar elements. The above and other aspects, features and advantages of certain embodiments of the present disclosure will be more apparent from the following detailed description, taken in conjunction with the accompanying drawings, in which:

FIG. 1 is a block diagram of an electronic device within a network environment 100 according to various example embodiments;

FIGS. 8(a)-(c) illustrate examples of various user interfaces provided according to a state change of a display of an electronic device according to various example embodiments;

FIGS. 11(a)-(d) illustrate examples of various user interfaces provided according to a state change of a display of an electronic device according to various example embodiments;

FIGS. 12B(a)-(c) illustrate examples of various user interfaces provided according to a state change of a display of an electronic device according to various example embodiments;

FIGS. 13(a)-(c) illustrate examples of various user interfaces provided according to a state change of a display of an electronic device according to various example embodiments;

DETAILED DESCRIPTION

Figure 1:
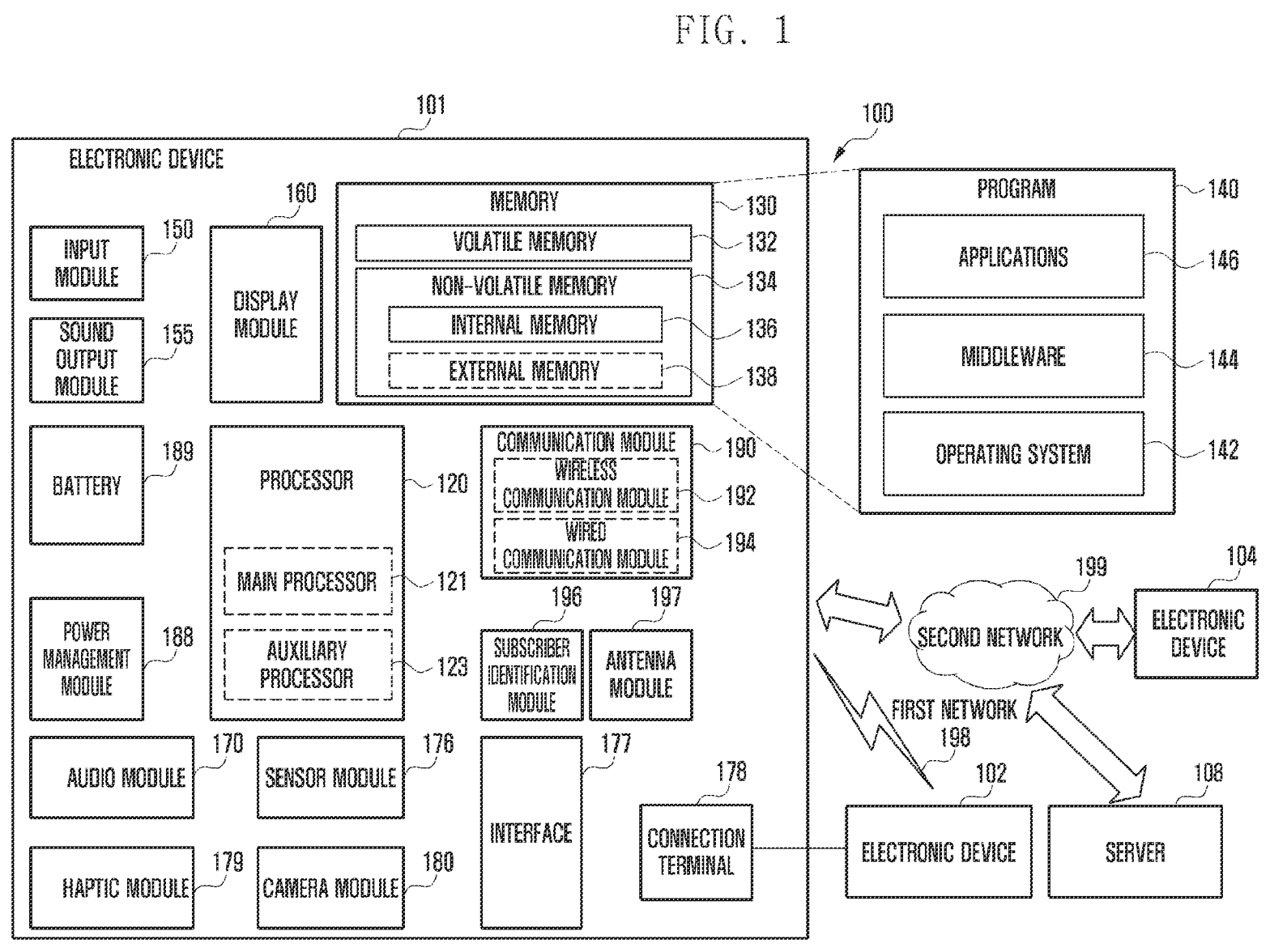
Figure 2A:
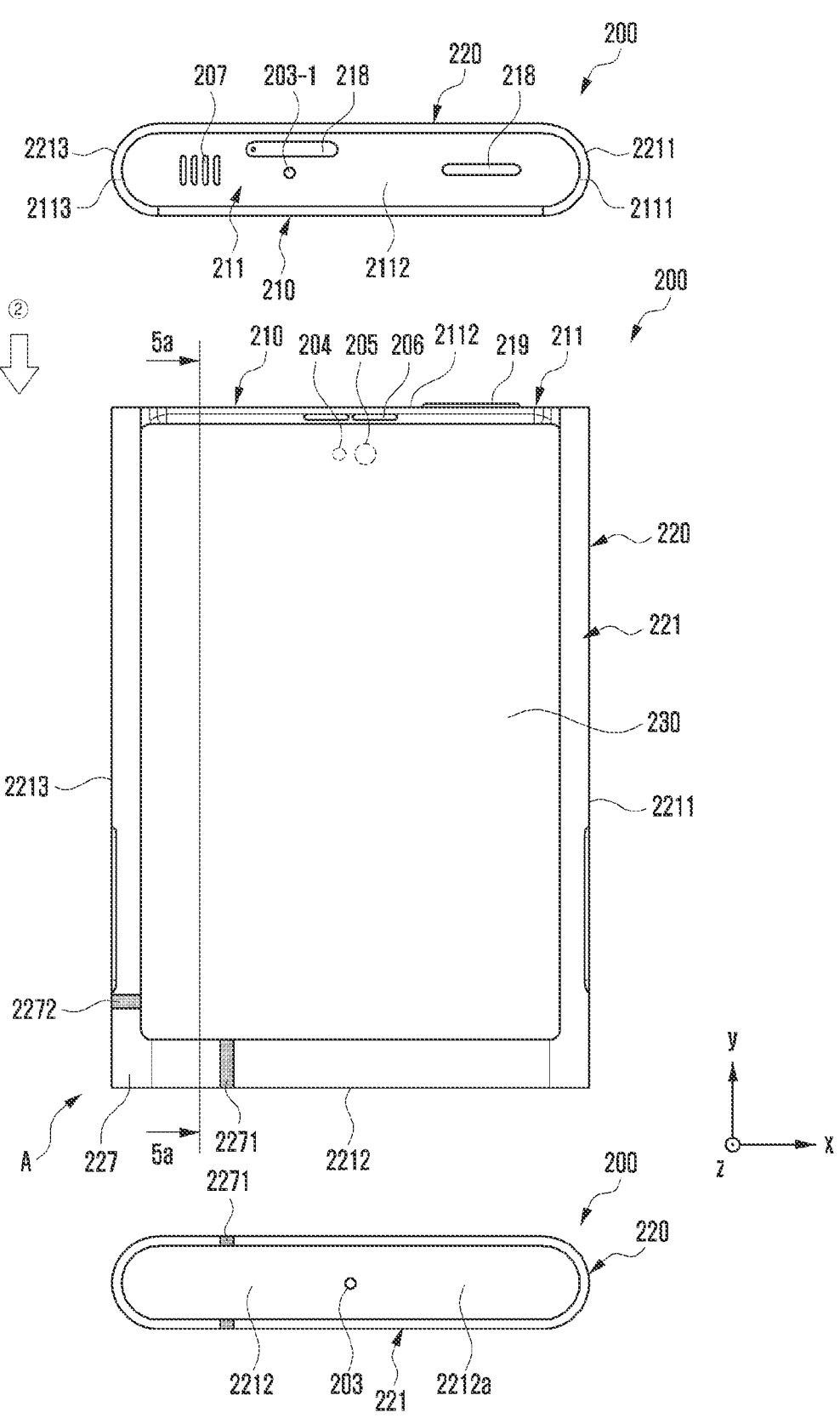
FIG. 2A illustrates a front view of an electronic device in a slide-in state according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2B:
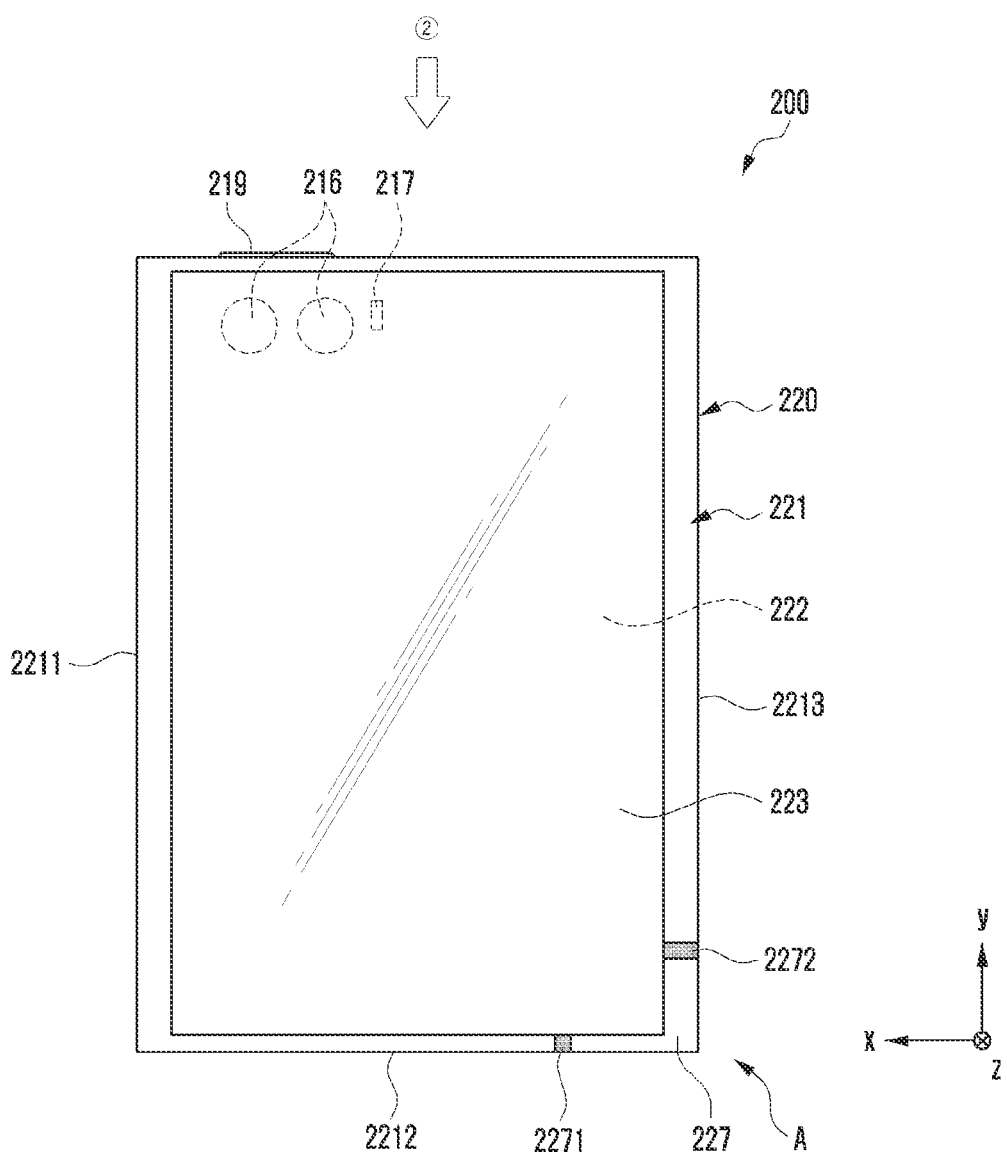
FIG. 2B illustrates a rear view of an electronic device in a slide-in state according to various example embodiments.
Figure 3A:
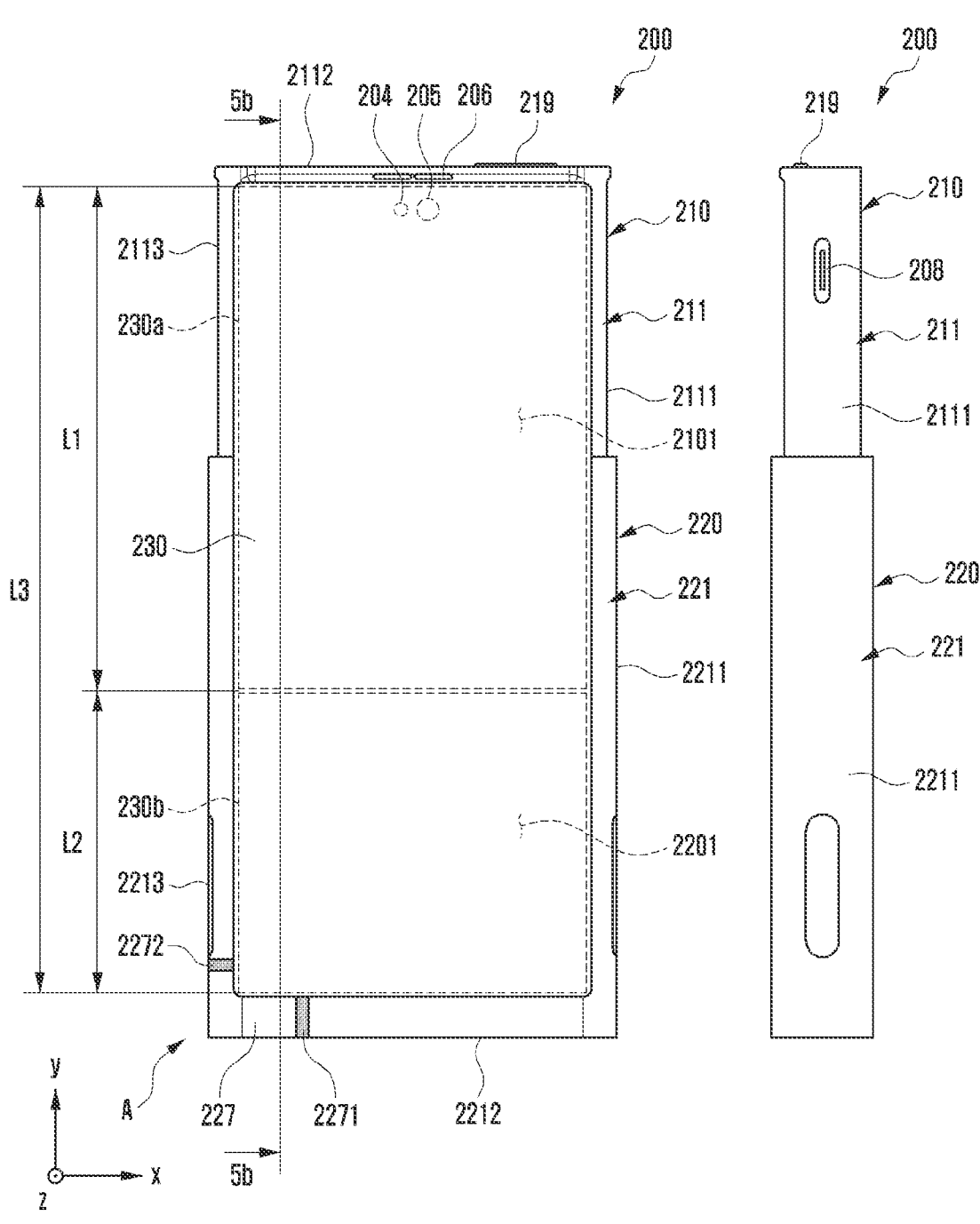
FIG. 3A illustrates a front view of an electronic device in a slide-out state according to various example embodiments.
Figure 3B:
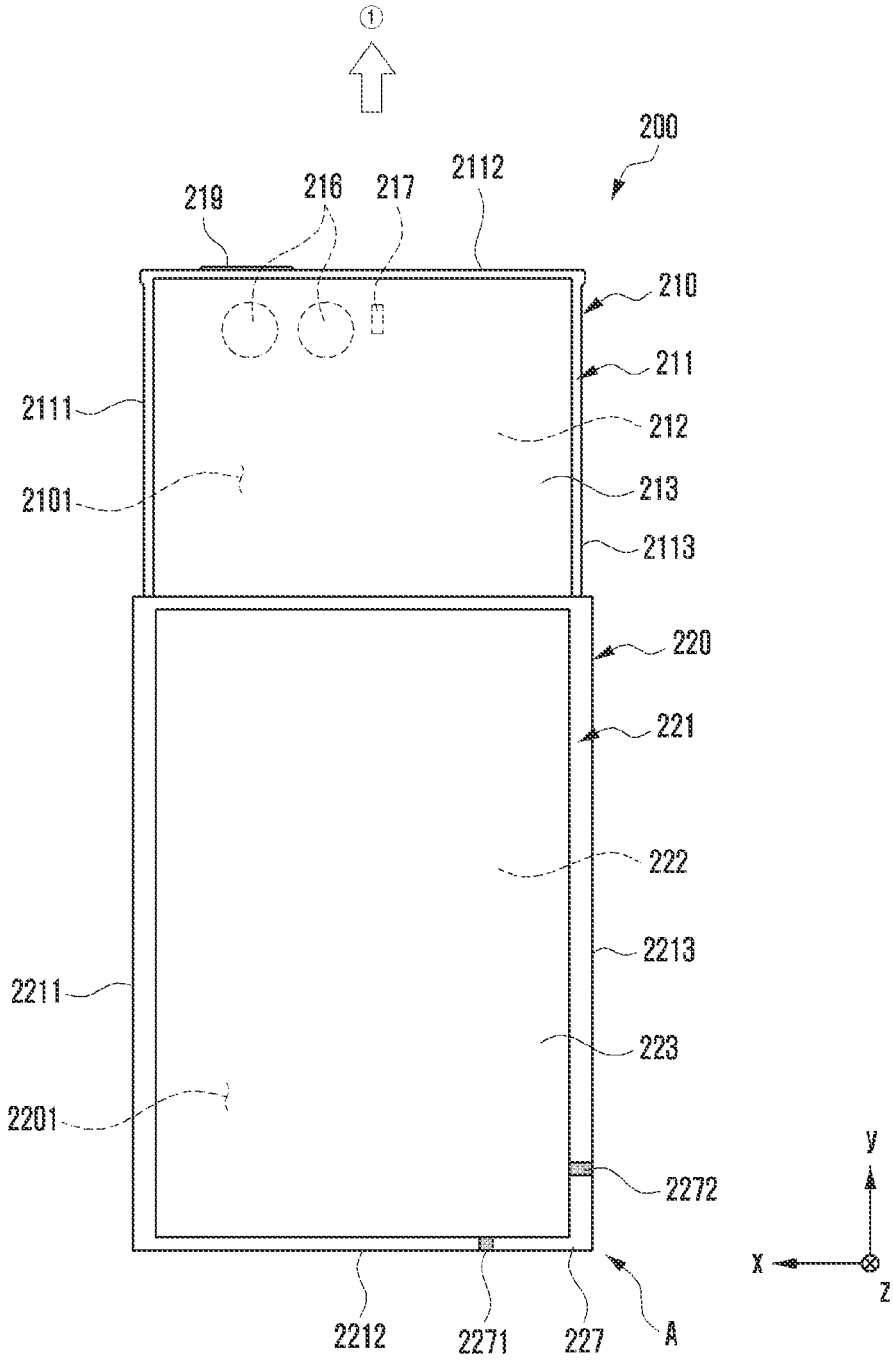
FIG. 3B illustrates a rear view of an electronic device in a slide-out state according to various example embodiments.

FIG. 2A illustrates a front view of an electronic device in a slide-in state according to various example embodiments, and FIG. 2B illustrates a rear view of an electronic device in a slide-in state according to various example embodiments, and FIG. 3A illustrates a front view of an electronic device in a slide-out state according to various example embodiments, and FIG. 3B illustrates a rear view of an electronic device in a slide-out state according to various example embodiments.

The electronic device 200 in FIGS. 2A to 3B may be at least partially similar to the electronic device 101 in FIG. 1 or may further include other embodiments of an electronic device.

Referring to FIGS. 2A and 3B, the electronic device 200 may include a first housing 210 (e.g., a first housing structure, a moving part, or a slide housing), a second housing 220 (e.g., a second housing structure, a fixing part, or a base hosing) slidably coupled to the first housing 210 in a designated direction (e.g., direction ① or direction ②) (e.g., the ±y-axis direction), and a flexible display 230 (e.g., an expandable display or a stretchable display) arranged to be supported through at least a portion of the first housing 210 and a portion of the second housing 220. According to an embodiment, based on the second housing 220 held by a user, the electronic device 200 may be arranged such that the first housing 210 is slid out in a first direction (direction ①) or slid in the second direction (direction ②) opposite to the first direction (direction ①). According to an embodiment, at least a portion of the first housing 210 including the first space 2101 may be received in a second space 2201 of the second housing 220, thereby achieving the transition to a slide-in state. According to an embodiment, in a slide-out state, the electronic device 200 may at least partially form the same plane as at least a portion of the first housing 210, and in the slide-in state, the electronic device 200 may include a bending support part (a bendable member or a bendable support member) (not shown) (e.g., articulated hinge module or multi-bar assembly) at least partially received in the second space 2201 of the second housing 220. According to an embodiment, in the slide-in state, at least a portion of the flexible display 230 may be received in the inner/second space 2201 of the second housing 220 while being supported by the bending support part, so as not to be invisible from the outside. According to an embodiment, in the slide-out state, at least a portion of the flexible display 230 may be disposed to be visible from the outside while being supported by the bending support part that forms at least partially the same plane as the first housing 210. The area of the flexible display 230 may increase or decrease when the portion visible to the outside is expanded or reduced according to the sliding of the first housing 210 relative to the second housing 220. For example, the flexible display may include a main display region, which is a display region that is always visible to the outside, and an expanded display region, which is an increasable/decreasable display region that is received inside the electronic device 200 (the second space 2201) or exposed to the outside according to the sliding of the first housing 210 relative to the second housing 220.

According to various embodiments, the electronic device 200 may include a first housing 210 including a first lateral/side member 211, and a second housing 220 including a second lateral/side member 221. According to an embodiment, the first lateral member 211 may include a first side surface 2111 extending at least partially in a first direction (e.g., the y-axis direction), a second side surface 2112 extending from the first side surface 2111 along a substantially perpendicular direction (e.g., the x-axis direction) to have a length shorter than the length of the first side surface 2111, and a third side surface 2113 at least partially extending substantially parallel to the first side surface 2111 from the second side surface 2112. According to an embodiment, the first lateral member 211 may be at least partially formed of a conductive material (e.g., metal). In an embodiment, the first lateral member 211 may be formed by combining a conductive material and a non-conductive material (e.g., a polymer). According to an embodiment, the first housing 210 may include a first support member 212 extending from at least a portion of the first lateral member 211 to at least a portion of the first space 2101. According to an embodiment, the first support member 212 may be integrally formed with the first lateral member 211. In an embodiment, the first support member 212 may be configured separately from the first lateral member 211 and structurally coupled, directly or indirectly, to the first lateral member 211.

According to various embodiments, the second side member 221 may include a fourth side surface 2211 at least partially corresponding to the first side surface 2111, a fifth side surface 2212 extending from the fourth side surface 2211 in a direction substantially parallel to the second side surface 2112 and shorter than the fourth side surface 2211, and a sixth side surface 2213 at least partially extending from the fifth side surface 2212 to correspond to the third side surface 2113. According to an embodiment, the second side member 221 may be at least partially formed of a conductive material (e.g., metal). In an embodiment, the second side member 221 may be formed by combining a conductive material and a non-conductive material (e.g., a polymer). According to an embodiment, at least a portion of the second side member 221 may include a second support member 222 extending to at least a portion of the second space 2201 of the second housing 220. According to an embodiment, the second support member 222 may be integrally formed with the second side member 221. In an embodiment, the second support member 222 may be configured separately from the second side member 221 and structurally combined to the second side member 221.

According to various embodiments, the first side surface 2111 and the fourth side surface 2211 may be slidably coupled, directly or indirectly, to each other. According to an embodiment, the third side surface 2113 and the sixth side surface 2213 may be slidably coupled to each other. According to an embodiment, the first side surface 2111 may be substantially invisible from the outside in the slide-in state by overlapping the fourth side surface 2211. According to an embodiment, the third side surface 2113 may be substantially invisible from the outside in the slide-in state by overlapping the sixth side surface 2213. In an embodiment, the first side surface 2111 and the third side surface 2113 may be disposed to be at least partially visible from the outside in the slide-in state. According to an embodiment, the first support member 212 may be substantially invisible from the outside in the slide-in state by overlapping the second support member 222. In an embodiment, in the slide-in state, a portion of the first support member 212 may be disposed invisible from the outside by overlapping the second support member 222, and the remaining portion of the first support member 212 may be disposed to be visible from the outside.

According to various embodiments, the rear surface of the electronic device 200 may include a first rear cover 213 coupled to the first housing 210. According to an embodiment, the first rear cover 213 may be disposed through at least a portion of the first support member 212. In an embodiment, the first rear cover 213 may be integrally formed with the first lateral/side member 211. According to an embodiment, the first rear cover 213 may be formed of a polymer, coated or tinted glass, ceramic, metal (e.g., aluminum, stainless steel (STS), or magnesium), or a combination of at least two of these materials. In an embodiment, the first rear cover 213 may extend to at least a portion of the first lateral member 211. In an embodiment, at least a portion of the first support member 212 may be replaced with the first rear cover 213.

According to various embodiments, the rear surface of the electronic device 200 may include a second rear cover 223 coupled, directly or indirectly, to the second housing 220. According to an embodiment, the second rear cover 223 may be disposed through at least a portion of the second support member 222. In an embodiment, the second rear cover 223 may be integrally formed with the second side member 221. According to an embodiment, the second rear cover 223 may be formed of a polymer, coated or tinted glass, ceramic, metal (e.g., aluminum, stainless steel (STS), or magnesium), or a combination of at least two of these materials. In an embodiment, the second rear cover 223 may extend to at least a portion of the second lateral member 221. In an embodiment, at least a portion of the second support member 222 may be replaced with a second rear cover 223.

According to various embodiments, the electronic device 200 may include a flexible display 230 disposed to be supported by at least a portion of the first housing 210 and the second housing 220. According to an embodiment, the flexible display 230 may include a first portion 230a (e.g., a flat part) always visible from the outside and a second portion 230b (e.g., a bendable part) extending from the first portion 230a and at least partially received in the second space 2201 of the second housing 220 so that at least a portion thereof is invisible from the outside in the slide-in state. According to an embodiment, the first portion 230a may be disposed to be supported by the first housing 210, and the second portion 230b may be disposed to be at least partially supported by the bending support part. According to an embodiment, in a state in which the first housing 210 is slid out along the first direction (direction (①)), the second portion 230b of the flexible display 230 may expand from the first portion 230a while being supported by the bending support part, form substantially the same plane as the first portion 230a, and be visible from the outside. According to an embodiment, in a state in which the second housing 220 is slid in along the second direction (direction (②)), the second portion 230b of the flexible display 230 may be received in the second space 2201 of the second housing 220 and disposed to be invisible from the outside. Accordingly, the electronic device 200 may induce the display area of the flexible display 230 to be varied as the first housing 210 slides from the second housing 220 along a designated direction (e.g., the ±y-axis direction).

According to various embodiments, the length of the flexible display 230 in the first direction (direction (①)) may be varied according to the sliding movement of the first housing 210 moving relative to the second housing 220. For example, in the slide-in state, the flexible display 230 may have a first display area corresponding to a first length (L1) (e.g., an area corresponding to the first portion 230a). According to an embodiment, in a slide-out state, the flexible display 230 may be expanded to correspond to a third length (L3) longer than the first length (L1) and to have a third display area (e.g., a region including the first portion 230a and the second portion 230b) larger than the first display area according to the sliding movement of the first housing 210 which has been additionally moved by a second length (L2) with reference to the second housing 220.

According to various embodiments, the electronic device 200 may include at least one of an input device (e.g., a microphone 203-1) disposed in the first space 2101 of the first housing 210, a sound output device (e.g., phone call receiver 206 conversation or speaker 207), a sensor module (204 or 217) comprising at least one sensor, a camera module (e.g., the first camera module 205 or the second camera module 216) comprising at least one camera, a connector port 218, a key input device 219, or an indicator (not shown). According to an embodiment, the electronic device 200 may include another input device (e.g., a microphone 203) disposed in the second housing. In another embodiment, the electronic device 200 may be configured such that at least one of the above-described components is omitted or other components are additionally included. In another embodiment, at least one of the components described above may be disposed in the second space 2201 of the second housing 220.

According to various embodiments, the input device may include a microphone 203-1. In an embodiment, the input device (e.g., the microphone 203-1) may include a plurality of microphones disposed to detect the direction of sound. The audio output device may include, for example, a phone call receiver 206 and a speaker 207. According to an embodiment, at a position (e.g., the second side surface 2112) that is always exposed to the outside regardless of the slide-in/slide-out state, the speaker 207 may correspond to the outside through a hole of at least one speaker disposed in the first housing 210. According to an embodiment, the connector port 218 may correspond to the outside through a connector port hole disposed in the first housing 210 in the slide-out state. In an embodiment, in the slide-in state, the connector port 218 may be disposed in the second housing 220 and may correspond to the outside through an opening disposed to correspond to the connector port hole. In an embodiment, the phone call receiver 206 may include a speaker (e.g., a piezo speaker) operating without a separate speaker hole.

According to various embodiments, the sensor modules 204 and 217 may produce electrical signals or data values corresponding to an internal operating state or an external environmental state of the electronic device 200. The sensor modules 204 and 217 may include, for example, a first sensor module 204 (e.g., a proximity sensor or an illuminance sensor) disposed on the front surface of the electronic device 200 and/or a second sensor module 217 (e.g., a heart rate monitoring (HRM) sensor) disposed on the rear surface of the electronic device 200. According to an embodiment, the first sensor module 204 may be disposed on the front side of the electronic device 200 to be under the flexible display 230. According to an embodiment, the first sensor module 204 and/or the second sensor module 217 may include at least one of a proximity sensor, an ambient light sensor, a time of flight (TOF) sensor, an ultrasonic sensor, a fingerprint recognition sensor, a gesture sensor, a gyro sensor, an air pressure sensor, a magnetic sensor, an acceleration sensor, a grip sensor, a color sensor, an IR (infrared) sensor, a biosensor, a temperature sensor, or a humidity sensor.

According to various embodiments, the camera module may include a first camera module 205 disposed on the front surface of the electronic device 200 and a second camera module 216 disposed on the rear surface of the electronic device 200. According to an embodiment, the electronic device 200 may include a flash (not shown) located near the second camera module 216. According to an embodiment, the camera modules 205 and 216 may include one or a plurality of lenses, an image sensor, and/or an image signal processor. According to an embodiment, the first camera module 205 may be disposed under the flexible display 230 and may be configured to photograph a subject through a part of an active region (e.g., a display region) of the flexible display 230.

According to various embodiments, the first camera module 205 among camera modules and the sensor modules 204 among sensor modules 204 and 217 may be disposed to detect an external environment through the flexible display 230. For example, the first camera module 205 or the sensor module 204 may be disposed in the first space 2201 of the first housing 210 to communicate with the external environment through a perforated opening or a transmissive region disposed on the flexible display 230. According to an embodiment, a region facing the first camera module 205 of the flexible display 230 is a part of a display region displaying contents and may be formed as a transmissive region having a designated transmittance. According to an embodiment, the transmissive region may be formed to have a transmittance in a range of about 5% to about 20%. The transmissive a region may include a region overlapping an effective region (e.g., a field of view area) of the first camera module 205, through which light for generating an image formed by an image sensor passes. For example, the transmissive region of the flexible display 230 may include a region in which an arrangement density and/or wiring density of pixels are lower than those of the surrounding region. For example, the transmissive region may replace the opening described above. For example, the camera module 205 may include an under-display camera (UDC). In an embodiment, the sensor module 204 may be arranged to perform the functions thereof in the internal space of the electronic device 200 without being visually exposed through the flexible display 230.

According to various embodiments, the electronic device 200 may include at least one antenna (e.g., the antenna 197 in FIG. 1) electrically connected to a wireless communication circuit (e.g., the wireless communication module 192 in FIG. 1, comprising communication circuitry) disposed in the first and/or second housing. According to an embodiment, the electronic device 200 may include a bezel antenna (A) disposed through the conductive second lateral member 221 of the second housing 220. For example, the bezel antenna (A) may be disposed on at least a portion of the fifth side surface 2212 and the sixth side surface 2213 of the second lateral member 221 and may include a conductive portion 227 electrically segmented through one or more segmental parts 2271 and 2272 formed of one segment formed of a non-conductive material (e.g., a polymer). According to an embodiment, the wireless communication circuit (e.g., the wireless communication module 192 in FIG. 1) may be configured to transmit or receive a wireless signal in at least one frequency band (e.g., about 800 MHz~6000 MHz) (e.g., a legacy band) designated through the conductive portion 227. According to an embodiment, the electronic device 200 may include a lateral cover 2212a disposed on the fifth side surface 2212 to cover at least a portion of the at least one segmental portion 2271. In an embodiment, the bezel antenna (A) may be disposed on at least one side surface of the second side surface 2112, the fourth side surface 2211, the fifth side surface 2212, and the sixth side surface 2213. In an embodiment, the electronic device 200 may further include at least one antenna module (e.g., a 5G antenna module or an antenna structure) disposed in the inner space (e.g., the first space 2101 or the second space 2201) thereof and arranged to transmit or receive wireless signals in a frequency band ranging from about 3 GHz to 100 GHz through another wireless communication circuit (e.g., the wireless communication module 192 in FIG. 1).

According to various embodiments, the sliding-in/sliding-out operation of the electronic device 200 may be automatically performed. For example, the sliding-in/sliding-out operation of the electronic device 200 may be performed by a driving motor (not shown) disposed in the first space 2101 of the first housing 210 and the gearing operation of a rack gear (not shown) disposed in the second space 2201 of the second housing 220. For example, when a triggering operation for transition from the slide-in state to the slide-out state or transition from the slide-out state to the slide-in state is detected, the processor (e.g., the processor 120 in FIG. 1) of the electronic device 200 may operate the driving motor (not shown) disposed inside the electronic device 200. According to an embodiment, the triggering operation may include selecting (e.g., touching) an object displayed on the flexible display 230 or manipulating a physical button (e.g., a key button) included in the electronic device 200.

Figure 4:
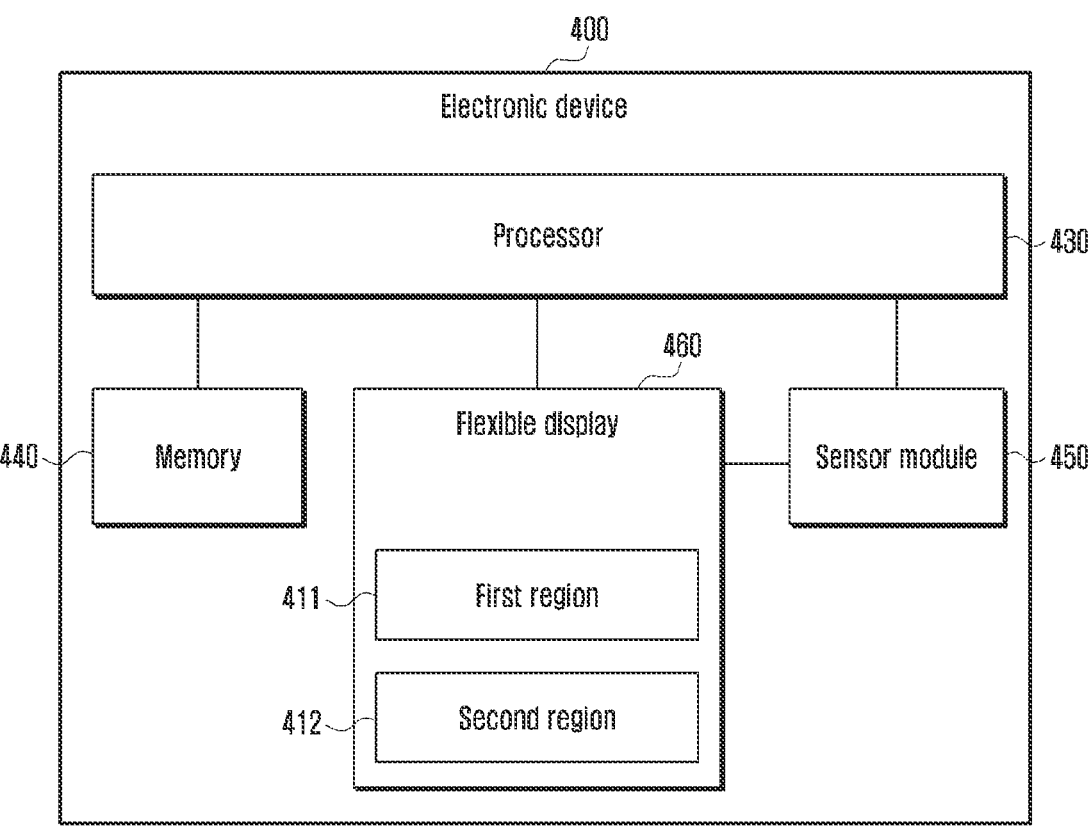
FIG. 4 is a block diagram of an electronic device according to various example embodiments.

FIG. 4 is a block diagram of an electronic device according to various embodiments.

Referring to FIG. 4, an electronic device 400 (e.g., the electronic device 101 in FIG. 1) may include a flexible display 460, a processor 430, a memory 440, and a sensor module 450 comprising at least one sensor, and some of the illustrated components may be omitted or substituted. The electronic device 400 may include at least some of the components and/or functions of the electronic device 101 in FIG. 1. The electronic device 400 may include the structure in FIGS. 2A, 2B, 3A, and 3B, but is not limited thereto, and may include, for example, a rollable structure which is slidably expandable or reduceable left and right, or a foldable structure which is foldable vertically or horizontally.

According to various embodiments, the flexible display 460 may include a main display region and at least one expansion display region. The flexible display 460 may include at least one expansion display region that is expandable from the main display area in at least one of up, down, left, and right directions. For example, when the display 460 is in the slide-in state or a reduced state as shown in FIG. 2B, only the main display region may be exposed to the outside to output a screen, and the expansion display region which is received so as not to be exposed to the outside may be in an inactive state and may not output a screen. For example, when the flexible display 460 is in the slide-out state or the expanded state as shown in FIG. 3A, at least a portion of the expansion display region may be exposed to the outside, and the at least exposed portion of the expansion display region may be transitioned into an active state to output a screen. Various forms of the expandable flexible display 460 have been previously described with reference to FIGS. 2A to 2B and 3A to 3B, but the embodiments are not limited thereto. When the flexible display 460 is slid out, a user interface screen may be displayed on the entire flexible display 460 in a fully unfolded state.

According to various embodiments, when the electronic device 400 is implemented in a foldable structure, the flexible display 460 may be implemented as a main display region, and the flexible display 460 may be folded or unfolded according to folding or unfolding of a housing of the foldable structure. In this case, in a state in which the flexible display 460 is folded and is not exposed to the outside while the housing is folded, the electronic device 400 may include an external display (not shown) mounted on a housing region which is exposed to the outside.

Hereinafter, the main display region exposed to the outside when the flexible display 460 is expanded or reduced as illustrated in FIGS. 2A to 3B may be referred to as a first region 411. The first region 411 may include, for example, a first display area (e.g., a region corresponding to the first portion 230a in FIG. 3A) corresponding to the first length (L1) in the slide-in state.

According to an embodiment, when the flexible display 460 is expanded, a region slid out by the expansion and exposed to the outside may be referred to as a second region 412. For example, in the slide-out state, the second region 412 may include a second display area (e.g., a region corresponding to the second portion 230b) corresponding to the second length (L2) according to the sliding movement of the first housing 210 which has been additionally moved by the second length (L2) with reference to the second housing 220.

Hereinafter, it is described that the first region 411 has a first display area corresponding to the first length and the second region 412 has a second display area corresponding to the second length, but this is not limited to the vertical length of the display. When the flexible display 460 is expanded or reduced in the horizontal direction by, for example, a housing that slides in the horizontal direction, the first region 411 and the second region may refer to the horizontal length.

According to an embodiment, the electronic device 400 (e.g., the electronic device 101 in FIG. 1) may identify the degree of reduction or expansion of the flexible display 460 according to the sensing operation of the sensor module 450 (e.g., the sensor module 176 in FIG. 1).

According to an embodiment, the electronic device 400 may identify the degree of folding or unfolding of the flexible display 460 according to the sensing operation of the sensor module 450.

The sensor module 450 may include, for example, at least one of a contact sensor such as a touch sensor, an infrared ray (IR) sensor, a time of flight (TF) sensor, a non-contact sensor, and a magnetic force sensor. The non-contact sensor may use an electromagnetic induction method, a capacitive method, a resistive method, or the like. The electronic device 400 may determine expansion/reduction and the degree thereof or folding/unfolding and the degree thereof with respect to the flexible display 460 by using the sensor measurement value measured using the sensor module 450.

According to various embodiments, the memory 440 may include known volatile memory and non-volatile memory, and specific implementation examples are not limited. The memory 440 may include at least part of the components and/or functions of the memory 130 in FIG. 1. In addition, the memory 440 may store at least part of the program 140 in FIG. 1.

The memory 440 may be functionally, operatively, and/or electrically connected, directly or indirectly, to the processor 430, and may store various instructions that may be executed by the processor 430. The instructions may include various control commands including arithmetic and logic calculations, data movement, and input/output that may be recognized by the processor 430.

According to various embodiments, the processor 430 is a component capable of performing calculations or data processing related to control and/or communication of each component of the electronic device 400 and may include at least part of the components and/or functions of the processor 120 in FIG. 1. The processor 430 may be functionally, operationally, and/or electrically connected to internal components of the electronic device 400 including the flexible display 460 and the memory 440.

Operation and data processing functions that the processor 430 may implement within the electronic device 400 will not be limited, but this document will give a description of various embodiments in which when the flexible display 460 is expanded or reduced, a user interface including various visual objects (e.g., text, an image, app or file icon, an emoticon, an emoticon sticker, an option menu list, various buttons or thumbnails, a keyboard) provided through an application according to the size of the expanded or reduced flexible display 460. The operations of the processor 430 to be described later may be performed by loading instructions stored in the memory 440.

According to various embodiments, the processor 430 may provide a user interface including a selectable visual object, such as text, image, app or file icon, emoticon, emojis, emoticon sticker, option menu list, various buttons or thumbnails, and keyboard, through the flexible display 460 according to execution of a specific application. For example, the specific application may include a message application.

According to various embodiments, the processor 430 may separately display message contents and a keyboard in different regions according to execution of the message application, and may display various selectable visual objects in various regions. For example, the message contents may be displayed in the upper region (hereinafter referred to as a message content region) and the keyboard may be displayed in the lower region (hereinafter referred to as a keyboard region), but embodiments are not limited thereto, and the message contents and the keyboard may be displayed in the left and right regions or may be displayed in a differently partitioned region, such as in the case of a floating keyboard. For example, the message contents may include various contents such as text, files, emojis, and stickers received or transmitted according to one-to-one conversations or group conversations. For example, the keyboard may include text, numbers, special characters, emoji selection buttons, input option selection buttons, configuration buttons, and/or various function selection buttons. The various selectable visual objects may include, for example, an add attachment button, an emoji including images corresponding to various expressions, an emoticon or sticker insertion button, a message sending button, a message classification button, a more options button, and/or a recipient display object. Some of the various selectable visual objects may be displayed near a new message input window or on the top edge of a screen. For example, a visual object representing a recipient and/or a more options button may be displayed on the top edge of the screen, and an add attachment button, an emoji, emoticon or sticker insertion button, a message sending button, and/or a message classification button may be displayed on the left or right side of the new message input window.

According to various embodiments, a user interface for various visual objects provided according to a message application may vary according to the expansion or reduction of the flexible display 460.

According to various embodiments, the processor 430 may identify the expanded or reduced state of the flexible display 460 according to the slide-in or slide-out of the housing (e.g., the first housing 210 and/or the second housing in FIG. 3A or 3B).

For example, the processor 430 may identify, through the sensor module 450, that the first housing 210 in FIG. 3A or 3B has been slid out from the second housing 220, and may identify that the flexible display 460 is in the expanded state in which the second region 412 is further exposed in addition to the existing first region 411. For example, the processor 430 may identify, through the sensor module 450, that the first housing 210 is received in the inner space 2201 of the second housing 220 to be disposed invisible from the outside, so as to identify that the flexible display is in the reduced state in which only the existing first region 411 is exposed to the outside without the exposure of the second region 412 to the outside.

For example, the processor 430 may identify the length of the flexible display 460 measured using the sensor module 450. The processor may determine that the electronic device 400 is not expanded when the length is a preconfigured first length, and determine that the electronic device is expanded when the length of the flexible display 460 measured using the sensor 450 is a third length relatively longer than the first length.

According to various embodiments, when the electronic device 400 is in the expanded state, the processor 430 may provide a user interface according to application execution through the first region 411 and the second region 412 corresponding to the third length. In the expanded state, the processor 430 may provide a user interface through a relatively wide region.

According to various embodiments, when the electronic device 400 is in the reduced state, the processor 430 may provide a user interface according to application execution through the first region 411 corresponding to the first length. In the reduced state, the processor 430 may provide a user interface through a relatively narrow region.

According to various embodiments, a user interface for visual objects including message contents and a keyboard provided according to a message application may vary according to the expansion or reduction of the flexible display 460.

According to an embodiment, when the flexible display 460 is reduced, the processor 430 may change the user interface such that contents having been separately provided in two or more visual object regions are provided within a single visual object region. Here, a visual object may include a message bubble defining a distinguished area in a screen of the flexible display 460. For example, text separately provided in different bubble regions may be provided in a single bubble region. For example, separately attached images may be displayed together in a single object region. For example, separately attached images may be displayed in a single object region along with the text displayed in another object region. For example, contents provided in different object regions, such as separately attached files, web links, and place links, may be displayed together in a single object region. For example, contents provided in different object regions, such as separately attached files, web links, and place links, may be displayed in a single object region along with the text displayed in a different object region. For example, emoticons separately attached as individual objects may be displayed together in a single object region. For example, emoticons separately attached as individual objects may be displayed together in a single object region.

According to an embodiment, when the contents separately provided in two or more visual object regions are provided in a single visual object region according to the reduction of the flexible display 460, the processor 430 may change the size, position, and/or color of two or more contents provided within a single visual object region, based on characteristics of each content. For example, the characteristics of the content may include the type of the content (e.g., text, an emoticon, or an image), the number of times the content has been displayed, or the number of reactions to the content.

According to an embodiment, when contents separately provided in two or more visual object regions are provided within a single visual object region according to the reduction of the flexible display 460, the processor 430 may add auxiliary content corresponding to the characteristics of the content with respect to the one or more of the two or more contents provided within a single visual object region.

According to an embodiment, when the flexible display 460 is reduced, the processor 430 may change a user interface such that some of a plurality of selectable objects are displayed and the remaining undisplayed objects are displayed via, for example, a swipe method.

According to an embodiment, when the flexible display 460 is reduced, the processor 430 may provide a user interface such that brief information such as the name of the file is provided to identify the selected file when a specific type of file is selected according to the selection of the add attachment button. When it is difficult to identify the selected file with brief information such as the name of the selected file, additional information on the selected file may be provided via, for example, a user input such as a scroll input.

According to an embodiment, when the flexible display 460 is reduced, the processor 430 may variably change the height and/or color of the new message writing window according to a new message writing state. For example, the height and/or transparency of a bubble or card including a received message may be changed in response to a change in the height and/or color of the new message writing window. Accordingly, the message writing state, reception, and/or transmission may be distinguished.

According to an embodiment, when the flexible display 460 is in the reduced state, the processor 430 may display messages classified according to the same category or characteristic in a message content region. For example, the processor 430 may display a message including the same keyword among the messages in the message content region. For example, the processor 430 may classify messages by the same sender and display the classified message in the message content region. For example, the processor 430 may display messages mentioning a user of the electronic device 400 in the message content region. For example, the processor 430 may display messages with reactions in the message content region. For example, the processor 430 may display secret messages in the message content region. For example, the processor 430 may display reply messages in the message content region. According to an embodiment, the processor 430 may enable messages of different categories or characteristics to be displayed according to a user input (e.g., swiping) for messages by each category or characteristic displayed in the message content region.

According to various embodiments, an electronic device (e.g., the electronic device 400 in FIG. 4) may comprise a housing including a first housing part and a second housing part (e.g., the first housing 210 and the second housing 220 in FIGS. 2A and/or 2B) configured to movably engage with the first housing part between a retracted position and an extended position, a flexible display (e.g., the flexible display 460 in FIG. 4) coupled to the first housing part and the second housing part such that a size of an area of the flexible display that is visible from a front side of the housing changes as the second housing part is moved between the retracted position and the extended position, a processor (e.g., the processor 430 in FIG. 4, comprising processing circuitry), and a memory (e.g. the memory 130 in FIG. 1) storing instructions. According to various embodiments, the instructions, when executed by the processor, may cause the electronic device to while the second housing part is in the extended position, display, on a first area of the flexible display visible from the front side, a first message bubble and a second message bubble, while the first message bubble and the second message bubble are displayed on the flexible display, identify that the second housing part is moved from the extended position to the retracted position, and based on the second housing part being moved from the extended position to the retracted position, display, on a second area of the flexible display visible from the front side, a combined message bubble by including a content of the first message bubble and a content of the second message bubble. Here a size of the second area of the flexible display may be smaller than a size of the first area of the flexible display.

According to various embodiments, a content of each of the first and second message bubbles may comprise at least one of texts, images, emoticons, emojis or files, and wherein a vertical distance between a top edge of the first message bubble to a bottom edge of the second message bubble while the housing is in the extended position may be greater than a vertical distance between a top edge of the combined message bubble to a bottom edge of the combined message bubble while the housing is in the retracted position.

According to various embodiments, wherein the instructions, when executed by the processor, further cause the electronic device to based on the second housing part being moved from the extended position to the retracted position, merge the first and second message bubbles into the combined message bubble having a width substantially corresponding to a width of an execution screen of a message application, the combined message bubble displaying texts included in the first and second message bubbles, wherein the width of the combined message bubble is greater than a width of the first message bubble and a width of the second message bubble.

According to various embodiments, wherein the instructions, when executed by the processor, further cause the electronic device to while the second housing part is in the extended position, display, on the first area of the flexible display visible from the front side, a plurality of message bubbles originating from a sender and a plurality of message bubbles originating from a user of the electronic device and based on the second housing part being moved from the extended position to the retracted position, display, on the second area of the flexible display visible from the front side, a first combined message bubble by merging contents of the plurality of message bubbles originating from the sender and a second combined message bubble by merging contents of the plurality of message bubbles originating from the user of the electronic device such that two or more message bubbles originating from an identical source are grouped and contents thereof are merged into a respective combined message bubble. According to various embodiments, wherein the instructions, when executed by the processor, further cause the electronic device to while the combined message bubble is displayed on the flexible display, identify that the second housing part is moved from the retracted position to the extended position, and based on the second housing part being moved from the retracted position to the extended position, display, on the first area of the flexible display visible from the front side, the first message bubble and the second message bubble by separating the content of the first message bubble and the content of the second message bubble from a content of the combined message bubble.

According to various embodiments, wherein a content of each of the first and second message bubbles may comprise at least one of texts, images, emoticons, emojis or files, and wherein the at least one of the texts, images, emoticons, emojis or files are arranged in an identical row of the combined message bubble.

According to various embodiments, wherein a content of each of the first and second message bubbles may comprise at least one of texts, images, emoticons, emojis or files, and wherein a plurality of identical text, image, emoticon, emojis or file, among the at least one of the texts, the images, the emoticons, the emojis or the files separately provided in the first and second message bubbles, are displayed as one identical text, image, emoticon, emojis or file in the combined message bubble.

According to various embodiments, wherein the instructions, when executed by the processor, further cause the electronic device to identify a third message bubble which provides reaction to the first or second message bubble, and based on the second housing part being moved from the extended position to the retracted position, merge the third message bubble into the combined message bubble.

According to various embodiments, wherein a height of the combined message bubble may be adjusted in accordance with an amount of the content of the first message bubble and the content of the second message bubble.

According to various embodiments, an electronic device comprises a housing including a first housing part and a second housing part configured to movably engage with the first housing part between a retracted position and an extended position, a flexible display coupled to the first housing part and the second housing part such that a size of an area of the flexible display that is visible from a front side of the housing changes as the second housing part is moved between the retracted position and the extended position, a processor, and a memory storing instructions. The instructions, when executed by the processor, may cause the electronic device to while the second housing part is in the extended position, display, on a first area of the flexible display visible from the front side, a first message bubble and a second message bubble, while the first message bubble and the second message bubble are displayed on the flexible display, identify that the second housing part is being moved from the extended position to the retracted position, and based on the second housing part being moved from the extended position to the retracted position, display, on a second area of the flexible display visible from the front side, a combined message bubble by including a content of the first message bubble and a content of the second message bubble, wherein a size of the second area of the flexible display is smaller than a size of the first area of the flexible display.

According to various embodiments, wherein the instructions, when executed by the processor, further cause the electronic device to while the second housing part is being moved from the extended position to the retracted position, merge texts included in the first message bubble and texts included in the second message bubble by gradually decreasing a spacing between the texts included in the first message and the texts included in the second message bubble.

According to various embodiments, wherein the instructions, when executed by the processor, further cause the electronic device to, based on the second housing part has been moved to the retracted position, place the texts included in the first message bubble and the texts included in the second message bubble in an identical row of the combined message bubble.

Figure 5:
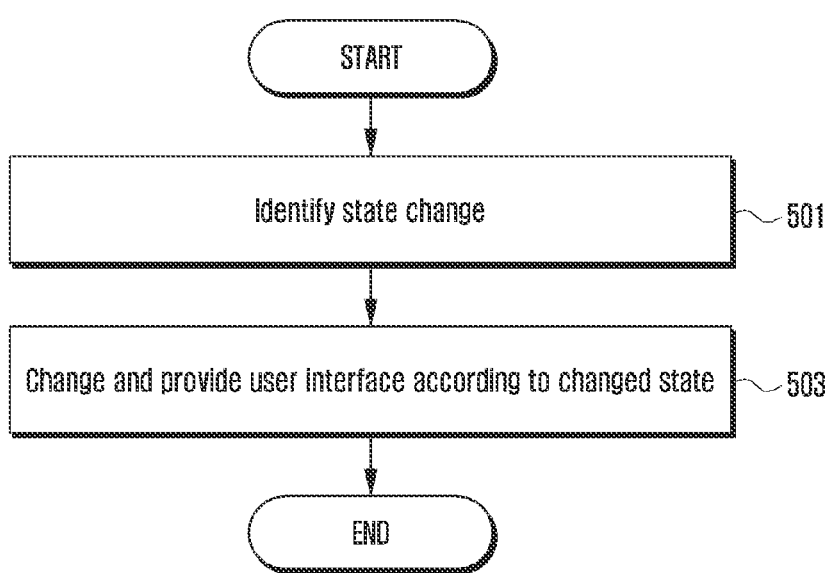
FIG. 5 is a flowchart illustrating an example of operations of an electronic device according to various example embodiments.

FIG. 5 is a flowchart illustrating an example of operations of an electronic device according to various embodiments.

Referring to FIG. 5, a processor (e.g., the processor 430 in FIG. 4) of an electronic device (e.g., the electronic device 400 in FIG. 4) may control the overall operation of an electronic device including a flexible display (e.g., the flexible display 460 in FIG. 4).

According to various embodiments, in operation 501, the processor 430 may identify that the state of the flexible display 460 is changed. The processor 430 may identify the length of the flexible display 460 measured using the sensor module 450, determine the electronic device 400 is not expanded when the length is a preconfigured first length, and determine that the electronic device 400 is expanded when the length of the flexible display 460 measured using the sensor 450 is a third length which is relatively longer than the first length. The processor 430 may confirm that the length of the flexible display is reduced and changed, for example, from the third length to the first length. The processor 430 may confirm that the length of the flexible display is expanded and changed, for example, from the first length to the third length.

According to an embodiment, the flexible display 460 may be expanded or reduced according to slide-out or slide-in of the housing (e.g., the first housing 210 and/or the second housing 220 in FIG. 3A or 3B) to have a variable size. For example, when the flexible display 460 is currently in a reduced state, the second region 412 may be exposed in addition to the existing first region 411 according to the slide-out of the housing (e.g., the first housing 210 and/or the second housing 220), and thus the flexible display 460 may be expanded and have an enlarged size. For example, when the flexible display 460 is currently in an expanded state, the first region 411 may be exposed to the outside without the exposure of at least a portion of the existing second region 412 to the outside according to the slide-in of the housing (e.g., the first housing 210), and thus the flexible display 460 may be reduced in size.

According to an embodiment, the flexible display 460 may have a structure in which the housing is vertically slid out or slid in as shown in the example of FIG. 3A or 3B. In addition, the flexible display 460 may be horizontally slid out or slid in to be expanded or reduced. Thus, the flexible display 460 may identify a state change thereof by detecting a change in size due to the expansion or reduction.

According to an embodiment, when the electronic device 400 is implemented in a foldable structure, the processor may identify the state change of the flexible display 460 which is folded or unfolded, for example, when the housing is transitioned to a folded or unfolded state.

According to an embodiment, in operation 503, the processor may change and provide a user interface according to a state change of the flexible display.

According to various embodiments, when the flexible display 460 of the electronic device 400 is vertically or horizontally expanded, the processor 430 may provide a user interface according to application execution through the first region 411 and the second region 412 corresponding to the third length.

According to various embodiments, when the flexible display 460 of the electronic device 400 is in a vertically or horizontally reduced state, the processor 430 may provide a user interface according to application execution through the first region 411 corresponding to the first length.

According to various embodiments, the processor 430 may provide a user interface through a relatively large region in an expanded state. The processor 430 may provide a user interface through a relatively small region in a reduced state.

According to various embodiments, a user interface for visual objects including a keyboard and message content provided according to a message application may be changed when the flexible display 460 is expanded or reduced.

According to an embodiment, when the flexible display 460 is reduced, the processor 430 may change the user interface such that contents having been separately provided in two or more visual object regions are provided within a single visual object region. For example, text separately provided in different bubble regions may be provided in a single bubble region. For example, separately attached images may be displayed together in a single object region. For example, separately attached images may be displayed in a single object region along with the text displayed in another object region. For example, contents provided in different object regions, such as separately attached files, web links, and place links, may be displayed together in a single object region. For example, contents provided in different object regions, such as separately attached files, web links, and place links, may be displayed in a single object region along with the text displayed in a different object region. For example, emoticons separately attached as individual objects may be displayed together in a single object region. For example, emoticons separately attached as individual objects may be displayed together in a single object region.

According to an embodiment, when the contents separately provided in two or more visual object regions are provided in a single visual object region according to the reduction of the flexible display 460, the processor 430 may change the size, position, and/or color of two or more contents provided within a single visual object region, based on characteristics of each content. For example, the characteristics of the content may include the type of the content (e.g., text, an emoticon, or an image), the number of times the content has been displayed, or the number of reactions to the content. For example, depending on the type of content, the size of text may be maintained, and the size of emoticons or images may be reduced and displayed.

According to an embodiment, when contents separately provided in two or more visual object regions are provided within a single visual object region according to the reduction of the flexible display 460, the processor 430 may add auxiliary content corresponding to the characteristics of the content with respect to the one or more of the two or more contents provided within a single visual object region.

According to an embodiment, when the flexible display 460 is reduced, the processor 430 may change a user interface such that some of a plurality of selectable objects are displayed and the remaining non-displayed objects are displayed via, for example, a swipe method.

According to an embodiment, when the flexible display 460 is reduced, the processor 430 may provide a user interface such that brief information such as the name of the file is provided to identify the selected file when a specific type of file is selected according to the selection of the add attachment button. When it is difficult to identify the selected file with brief information such as the name of the selected file, additional information on the selected file may be provided via, for example, a user input such as a scroll input.

According to an embodiment, when the flexible display 460 is reduced, the processor 430 may variably change the height and/or color of the new message writing window according to a new message writing state. For example, the height and/or transparency of a bubble or card including a received message may be changed in response to a change in the height and/or color of the new message writing window. Accordingly, the message writing state, reception, and/or transmission may be distinguished.

According to an embodiment, when the flexible display 460 is in the reduced state, the processor 430 may display messages classified according to the same category or characteristic in a message content region. For example, the processor 430 may display a message including the same keyword among the messages in the message content region. For example, the processor 430 may classify messages by the same sender and display the classified message in the message content region. For example, the processor 430 may display messages mentioning a user of the electronic device 400 in the message content region. For example, the processor 430 may display messages with an emoticon (e.g., reaction) indicating likes or comments on the message in the message content region. For example, the processor 430 may display secret messages in the message content region. For example, the processor 430 may display reply messages in the message content region. According to an embodiment, the processor 430 may enable messages of different categories or characteristics to be displayed according to an input (e.g., left and right swiping) for the message content region.

According to an embodiment, when the flexible display 460 in the reduced state is expanded, the processor 430 may reversely change the user interface having been changed according to the reduction described above, to provide the user interface provided in an expanded state before the reduction.

According to an embodiment, when the flexible display 460 is expanded, the user interface may be changed such that contents provided in a single visual object region are separately provided in two or more visual object regions. For example, text provided in a single bubble region may be separated and provided in two or more bubble regions. For example, separately attached images may be displayed together in a single object region. For example, attached images displayed in a single object region may be separated and provided to be displayed in two or more object regions, and text displayed together may also be displayed separately in different object regions.

According to an embodiment, in case that the electronic device 400 is implemented in a foldable structure, for example, when the housing is changed to a folded state and the flexible display 460 is folded, the processor may change the user interface provided through the flexible display 460 to provide the user interface through an external display (not shown). In this case, the processor may provide, through the external display (not shown), the identical or similar user interface to the user interface changed and provided when the flexible display 460 having a rollable structure as described above is reduced.

Figure 6:
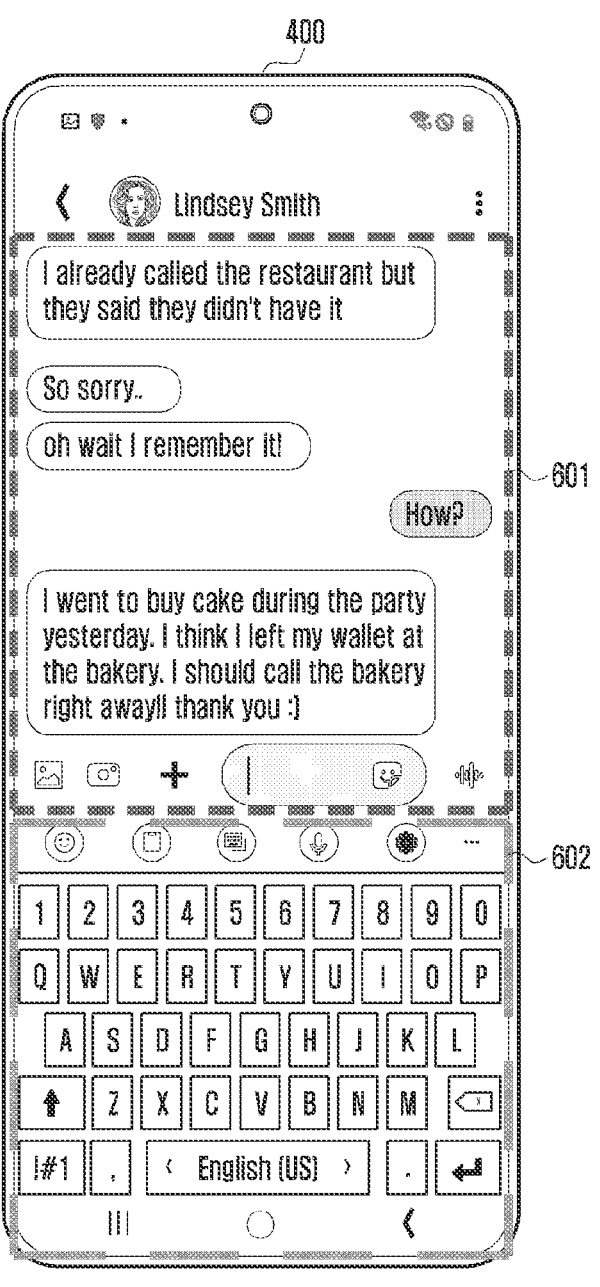
FIG. 6 illustrates an example of various user interfaces provided according to a state change of a display of an electronic device according to various example embodiments.

FIG. 6 illustrates examples of various user interfaces provided according to a state change of a display (e.g., the display 460 in FIG. 4) of an electronic device (e.g., the electronic device 400 in FIG. 4) according to various embodiments.

According to various embodiments, an application execution screen may be provided on the display when a specific application (e.g., a message application) is executed on the electronic device 400.

In the example of FIG. 6, when the message application is executed, the message application execution screen may be displayed in a first region 601 and the keyboard screen may be displayed in a second region 602.

According to an embodiment, the message application execution screen displayed in the first region 601 may display each transmitted or received message content in a single object (e.g., a bubble). A bubble including a transmitted or received message may be displayed such that the position and/or color thereof are different according to transmission or reception. For example, a reception message bubble may be displayed inside an object displayed at the top of the screen, and an outgoing message bubble may be displayed inside an object displayed at the bottom of the screen, in order according to transmission or reception time points, respectively.

According to an embodiment, the first region 601 may include a new message input window and/or various selectable objects (e.g., an existing image file attachment icon, a new image creation attachment icon, other attachment selection icons, an emoji selection icon, and/or a voice file creation attachment icon).

According to an embodiment, the keyboard displayed in the second region 602 may include various objects for inputting numbers, letters, and/or various special characters.

According to an embodiment, the second region 602 may include various selectable objects (e.g., an emoji input icon, a voice input icon, a keyboard configuration icon, a search icon, and/or various function selection icons).

According to an embodiment, the second region 602 may include a button for identifying various applications running in the background, a button for going to a homepage, and/or a button for returning to a previous execution screen.

Figure 7:
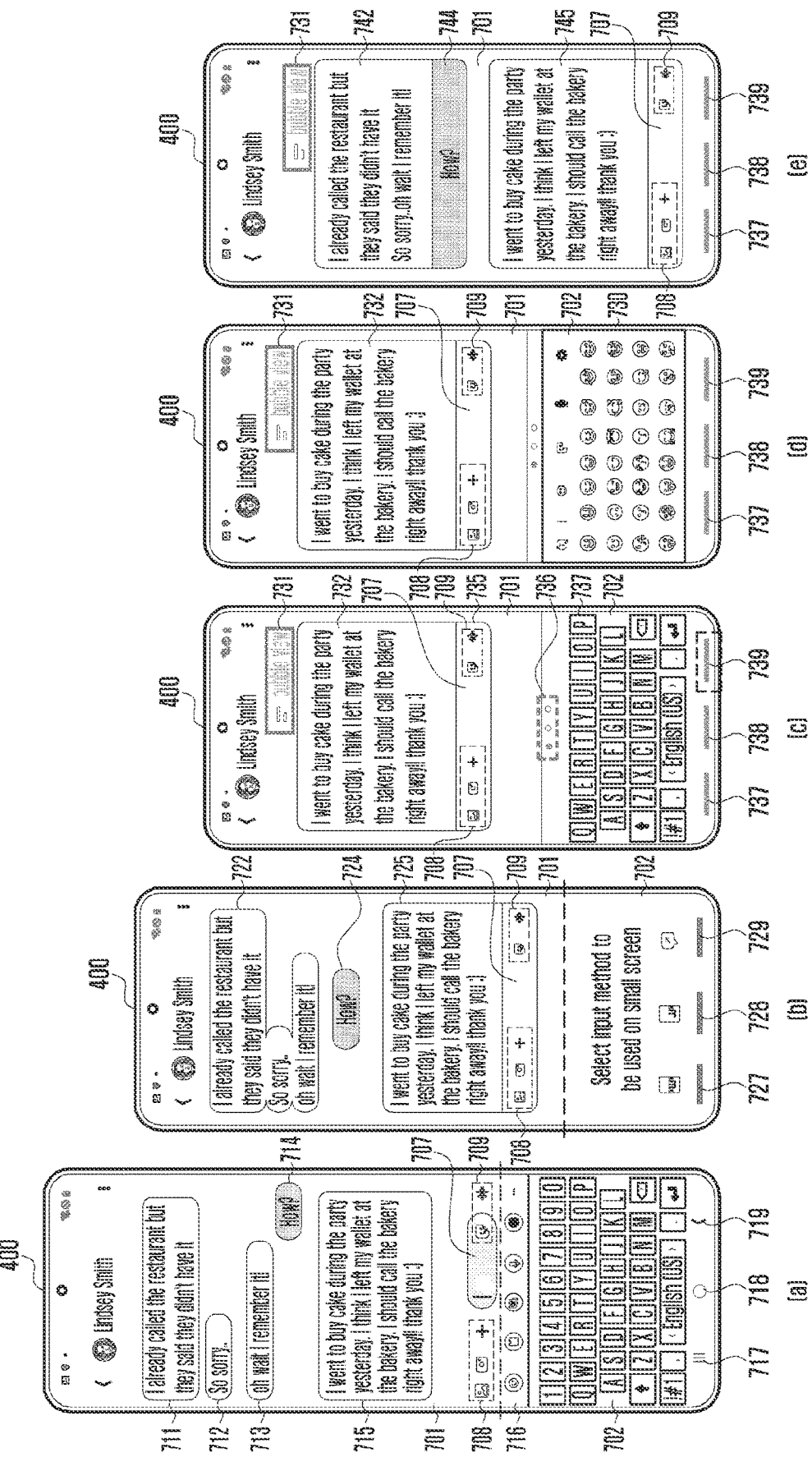
FIGS. 7(a)-7(e) illustrate examples of various user interfaces provided according to a state change of a display of an electronic device according to various example embodiments.

FIG. 7 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on the display screen when a specific application (e.g., a message application) is executed on the electronic device 400.

According to an embodiment, as shown in screen (a), when the message application is executed, a message application execution screen may be displayed in a first region 701 (e.g., the first region 601 in FIG. 6), and a keyboard screen for inputting a new message may be displayed in a second region 702 (e.g., the second region 602 in FIG. 6). For example, the keyboard screen may include text, numbers, a special character, an emoji selection button, an input option selection button, a configuration button, and/or various function selection buttons.

According to an embodiment, the first region 701 may include a new message input window 707 and/or various selectable objects 708 (e.g., an existing image file attachment icon, a new image creation attachment icon, other attachment selection icons).

According to an embodiment, an emoji selection icon and/or a voice file creation attachment icon 709 may be included.

According to an embodiment, the message application execution screen displayed in the first region 701 may display each transmitted or received message content in a single object (e.g., a bubble). A bubble including a transmitted or received message may be displayed such that the position and/or color thereof are different according to transmission or reception. For example, a reception message bubbles 711, 712, 713, and/or 715 may be displayed at the top of the screen, and an outgoing message bubble 714 may be displayed at the bottom of the screen, in order according to transmission or reception time points, respectively.

According to an embodiment, referring to screen (b), as the display is partially reduced, the contents displayed in the message bubbles 711, 712, and 713 may be merged and displayed in the single message bubble 722. The message bubbles to be merged may be message bubbles sent by the same person. The message bubbles to be merged may be message bubbles that have been sent within a specified time. The message bubbles to be merged may be contiguously transmitted message bubbles. For example, the message bubble 715 may not be contiguous with message bubble 713 due to intervening message bubble 714, and thus may not be merged. Here, a vertical distance between a top edge of the message bubble 711 to a bottom edge of the message bubble 713 while the housing is in the extended position is greater than a vertical distance between a top edge of the combined message bubble 722 to a bottom edge of the combined message bubble 722 while the housing is in the retracted position. Furthermore, the width of the combined message bubble 722 may be greater than a width of each of the message bubble 711, 712 and 713.

According to an embodiment, on screen (b) where the display is partially reduced, the contents respectively provided in the message bubbles 711, 712, and 713 before being merged within the merged message bubble 722 may be displayed, for example, in different rows, to be distinguished from each other.

According to an embodiment, the location or shape of the unmerged message bubble (e.g., 724 or 725) on screen (b) may be changed.

According to an embodiment, on screen (c) where the display is further reduced than screen (b), the contents respectively provided in the message bubbles 711, 712, and 713 before being merged within the merged message bubble 732 may be further merged to be displayed on screen (c), the text respectively provided in the message bubbles 711, 712, and 713 before mergence may be subsequently displayed without changing rows, and thus, the area occupied within the merged message bubble 722 may be reduced. Accordingly, the area, particularly the height, of the merged message bubble 722 may be reduced.

According to an embodiment, the merged message bubble 722 may be provided in a card view form as shown in screens (c), (d) or (e), and may be displayed in each bubble as shown in screen (a) by selection of the selectable object 731 provided at the top of the bubble 722.

According to an embodiment, the size of the first region 701 displaying the message execution screen may be reduced according to the reduction of the screen. The reduced first region may cause difficulties in displaying all the message bubbles displayed before the reduction. Accordingly, the latest message bubble 732 may be displayed adjacent to the top of the input message window 735 in a card view form on screen (c).

According to an embodiment, the keyboard displayed in the second region 702 may include various objects for inputting numbers, letters, and/or various special characters.

According to an embodiment, the second region 702 may include various selectable objects 716 (e.g., an emoticon input icon, a voice input icon, a keyboard configuration icon, a search icon, and/or various function selection icons).

According to an embodiment, the second region 702 may include a button 717 for identifying various applications running in the background, a home page or home screen shortcut button 718, and/or a button 719 for returning to a previous execution screen.

According to an embodiment, as displayed on screen (b), a keyboard method may be changed when the size of the display of the electronic device 400 is partially reduced. For example, icons for selecting a normal keyboard 727, a one-handed keyboard 728, and/or a smart input type 729 may be provided as an input type to be used on a small screen.

According to an embodiment, an input and guidance for changing a keyboard method are provided on screen (b), but such input and/or guidance may be omitted.

According to an embodiment, the keyboard input method provided according to the size reduction of the display may be provided in a predetermined method.

According to an embodiment, as displayed on screen (c), a general keyboard method may be provided as the size of the display of the electronic device 400 is reduced. The general keyboard method may be provided, for example, in a predetermined method or according to a user's selection. For example, the layout and/or size of the keyboard may remain the same, or only the layout may remain the same and the size may be reduced.

According to an embodiment, various selectable objects 716 displayed in the second region 702 may be removed according to the reduction of the display screen, and the selectable object 736 may be provided to replace the various selectable objects 716 (e.g., an emoji input icon, a voice input icon, a keyboard settings icon, a search icon, and/or various functions selection icons). The input for selectable object 736, for example, one of various selectable objects 716, display of which is omitted according to left and right swipes (e.g., an emoji input icon), may be selected to be displayed in the second region 702.

According to an embodiment, when an emoji input icon, which is one of various objects 716, is executed via an input to a selectable object 736 on screen (c), screen (d) may display a screen on which a screen including emojis 730 is displayed in the second region 702.

According to an embodiment, input methods may be changed via an input to the selectable object 736 on screen (c). For example, screen (c) may display a general keyboard method, and may display a one-handed keyboard method screen (e.g., screen (b) in FIG. 17, or smart input method screen (e.g., screen (c) in FIG. 17)) via an input to the object 736.

According to an embodiment, the smart input method screen may include a function of analyzing contents (e.g., keywords) included in the message card displayed in the first region 1701 and providing a response by using text or an emoticon, and the smart input method screen may display a quick answer screen when an answer is providable, and otherwise, may display a keyboard screen.

According to an embodiment, when the size of the display is reduced according to the reduction, the navigation bar (e.g., the button 717 for identifying various applications running in the background, go to homepage button 718 and/or button 719 for returning to the previous running screen) provided in the second region 702 of the expanded display screen (a) may be displayed as horizontal bar-shaped objects 737, 738, and 739 as shown in screens (c), (d) or (e).

According to an embodiment, as described above, the size of the first region 701 displaying the message execution screen may be reduced when the screen is reduced, and the reduced first region may cause difficulties in displaying all the messages displayed before the reduction. Accordingly, on screen (c), for example, according to the selection of the object 739, the keyboard display may be removed, and the message execution screen may be displayed on the entire screen.

According to an embodiment, on screen (e), when the keyboard display is removed, display of the second region 702 may be omitted, and the first region 701 may be displayed on the entire screen so that messages 742, 744, and 745 may be displayed in a card view form. The messages 742, 744, and 745 may be displayed in a bubble view form according to the selection of the object 731.

Figure 8:
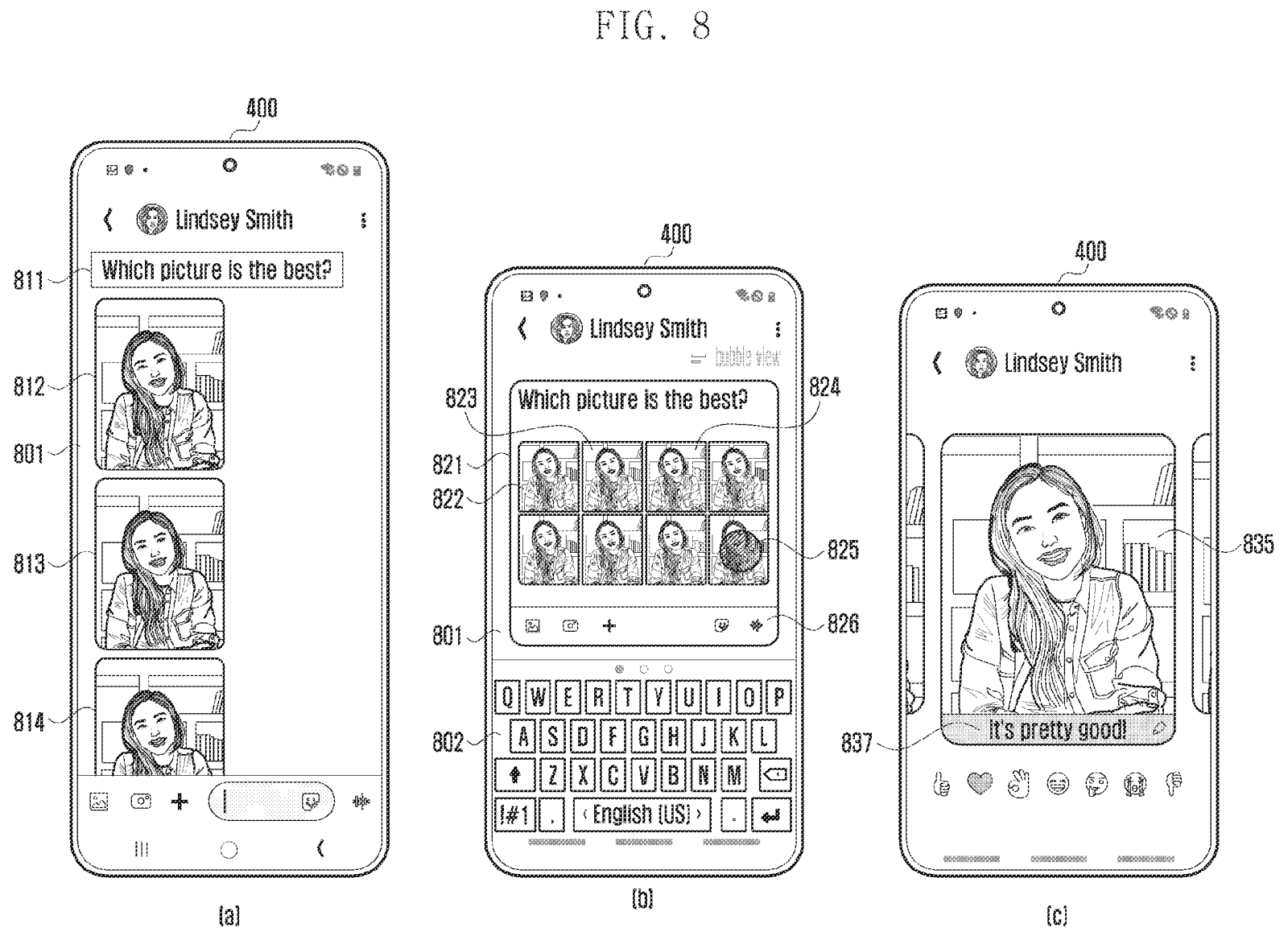

FIG. 8 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on the display screen when a specific application (e.g., a message application) is executed on the electronic device 400.

According to an embodiment, as shown in screen (a), when the message application is executed, a message application execution screen may be displayed in a first region 801 (e.g., the first region 601 in FIG. 6). The first region 801 may be displayed on the entire screen, and the second region 802 (e.g., the second region 602 in FIG. 6) in which a keyboard screen is displayed may omit the display of the keyboard screen.

According to an embodiment, the message application execution screen displayed in the first region 801 may display each transmitted or received message content in a single object (e.g., a bubble). A bubble including a transmitted or received message may be displayed such that the position and/or color thereof are different according to transmission or reception. For example, reception message bubbles 811, 812, 813, and 814 may be displayed on the left side of the screen and outgoing message bubbles may be displayed on the right side of the screen, in order according to transmission or reception time points, respectively. The message bubbles may contain text, an image, a homepage link, and/or a file. For example, the message bubble 811 may include text, and the message bubbles 812, 813, and 814 may include an image file, respectively.

According to an embodiment, the first region 801 may include a new message input window and/or various selectable objects (e.g., an existing image file attachment icon, a new image creation attachment icon, other attachment selection icons, an emoji selection icon, and/or a voice file creation attachment icon).

According to an embodiment, when the display of the electronic device 400 is reduced, the user interface may be changed such that contents separately provided in two or more visual object regions are provided within a single visual object region. For example, the images 812, 813, and/or 814, which are separately attached and provided in different bubble regions on the expanded display screen (a), may be displayed together on screen (b) as the images 822, 823, 824, and 825 in a single object (e.g., a single card 821) region according to the reduction of the display. For example, the text 811 provided in the individual bubble regions on the expanded display screen (a) may be displayed on screen (b), as text 821, together with the images 822, 823, 824, and 825 within a single card region in the region of the single object (e.g., a single card) 821, according to the reduction of the display.

According to an embodiment, according to the selection of one image 825 from among images displayed in a single card region, the selected image may be enlarged and displayed as shown in screen (c).

According to an embodiment, when a new message input window 826 is selected on screen (b), a keyboard may be provided in the second region 802.

According to an embodiment, on screen (c), a state in which an image 835 is selected, for example, is enlarged and displayed, text 837 input through a keyboard displayed in the second region 802 may be displayed in or adjacent to the card region 835 containing the selected image.

Figure 9:
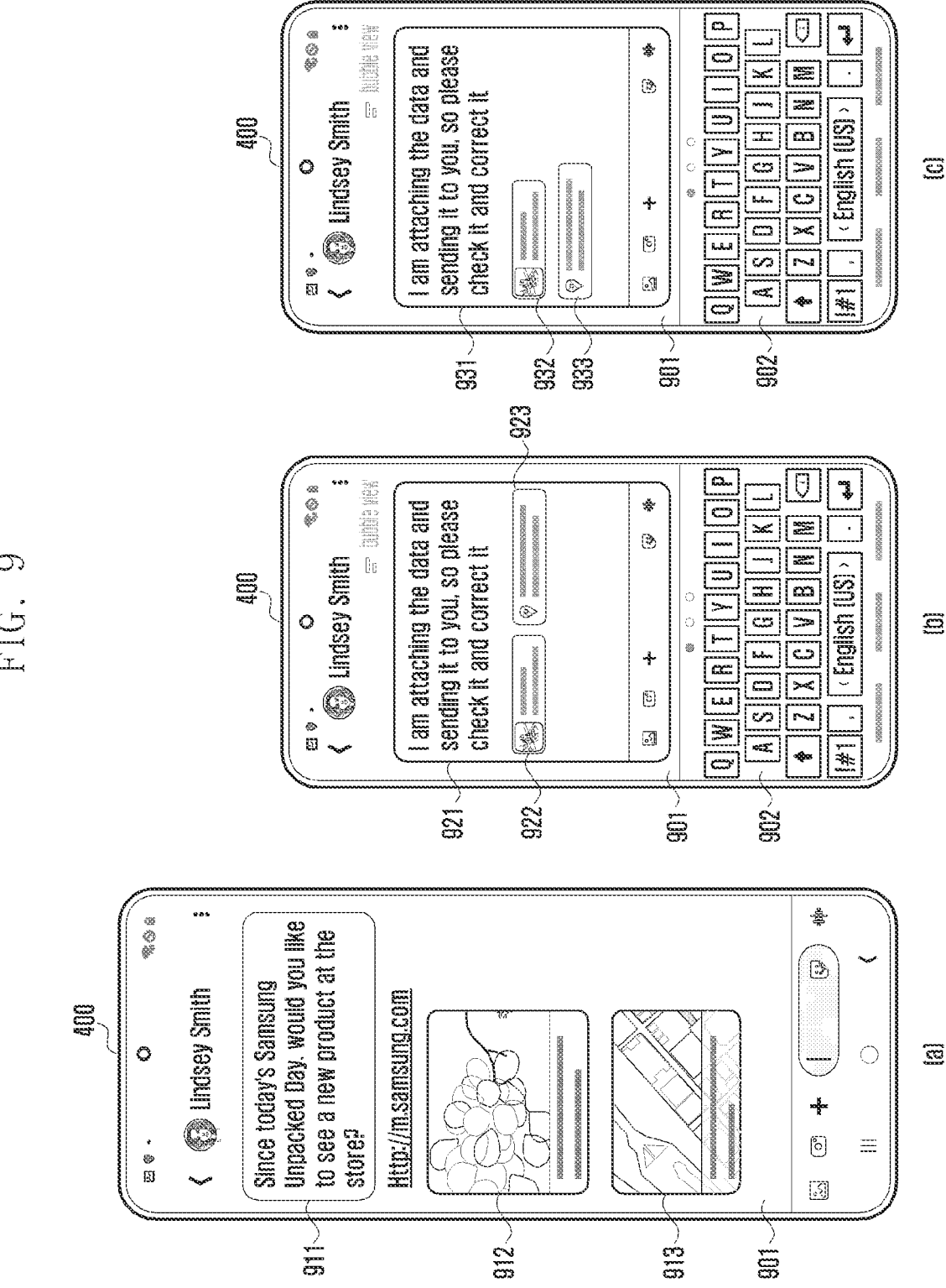
FIGS. 9(a)-(c) illustrate examples of various user interfaces provided according to a state change of a display of an electronic device according to various example embodiments.

FIG. 9 illustrates examples of various user interfaces provided according to a state change of a display (e.g., the flexible display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on the display screen when a specific application (e.g., a message application) is executed on the electronic device 400.

According to an embodiment, as shown in screen (a), when the message application is executed, a message application execution screen may be displayed in a first region 901 (e.g., the first region 601 in FIG. 6). The first region 901 may be displayed on the entire screen, and the second region 902 (e.g., the second region 602 in FIG. 6) in which a keyboard screen is displayed may omit the display of the keyboard screen.

According to an embodiment, the message application execution screen displayed in the first region 901 may display each transmitted or received message content in a single object (e.g., a bubble).

According to an embodiment, the incoming message bubbles 911, 912 and 913 may be displayed on the left side of the screen in order according to transmission time points, respectively. The message bubbles may contain text, an image, a homepage link, and/or a file. For example, the message bubble 911 may contain text, the message bubble 912 may contain a homepage link, and message bubble 913 may contain an image file.

According to an embodiment, when the display of the electronic device 400 is reduced, the user interface may be changed such that contents separately provided in two or more visual object regions are provided within a single visual object region. For example, the text 911, the homepage link 912, and the map file 913 that are separately attached and provided in different bubble regions on the expanded display screen (a) may be displayed together on screen (b) as content in a region of a single object (e.g., a single card) 921, for example, text and attached icons 922 and 923 according to the reduction of the display.

According to an embodiment, when the display is reduced, the size, position, and/or color of two or more contents provided within a region of a single visual object 921 may be changed based on characteristics of each content. For example, the text displayed in the single object 921 may be positioned at the top and the size thereof may be maintained. For example, image icons 922 and 923 respectively representing a homepage link 912 and a map file 913 displayed in a single object 921 may be reduced in size and displayed left and right in the same row as in screen (b). For example, as shown in screen (c), the image icons 932 and 933 representing the screen homepage link 912 and the image file 913, respectively, may be reduced in size and displayed in a single object 931 to be displayed top to bottom in different rows.

According to an embodiment, when one of the image icons 922, 923, 932, or 933 displayed in the region of one card 921 or 931 is selected on screen (b) or screen (c), the selected image icon may be linked to the corresponding homepage link or displayed as an attached map file.

Figure 10A:
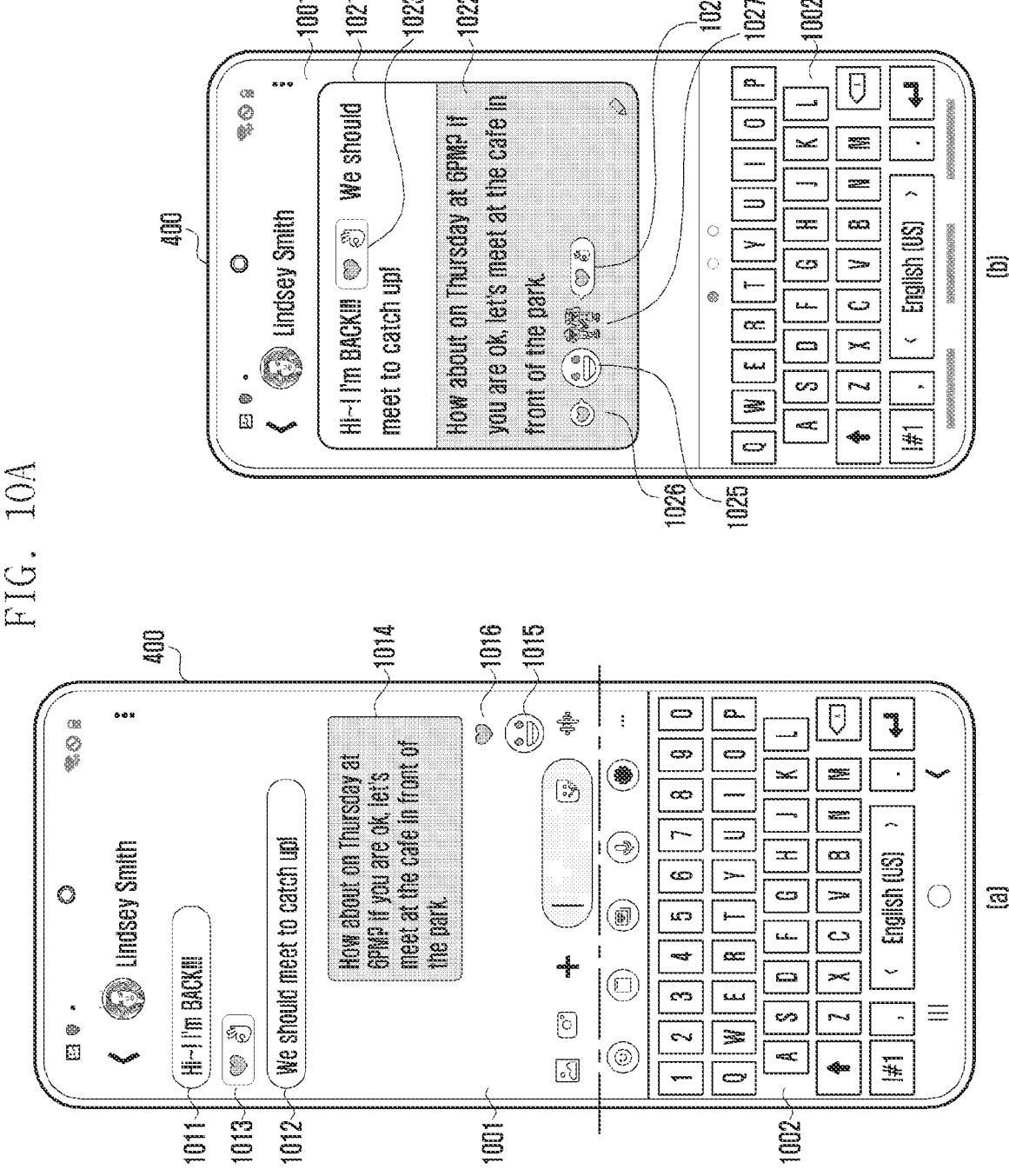
FIG. 10A(a)-(b) illustrate examples of various user interfaces provided according to a state change of a display of an electronic device according to various example embodiments.

FIG. 10A illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on the display screen when a specific application (e.g., a message application) is executed on the electronic device 400.

According to an embodiment, as shown in screen (a), when the message application is executed, a message application execution screen may be displayed in a first region 1001 (e.g., the first region 601 in FIG. 6). For example, the message application execution screen may display each transmitted or received message content in a single object (e.g., a bubble).

According to an embodiment, incoming message bubbles 1011 and 1012, which may be displayed on the left side of the screen, and an outgoing message bubble 1014 may be displayed in order according to transmission or reception time points, respectively. The message bubbles may contain text and an emoji. For example, the message bubbles 1011, 1012, and 1014 may each include text. The bubble 1013 is a bubble subordinate to another bubble 1011 and may be a bubble representing a reaction to the message bubble 1011. The bubble 1015 may represent an emoji including an image expressing emotion.

According to an embodiment, a keyboard screen may be displayed in a second region 1002 (e.g., the second region 602 in FIG. 6). For example, the keyboard screen may include text, numbers, special characters, an emoji selection button, an input option selection button, a configuration button, and/or various function selection buttons.

According to an embodiment, the first region 1001 may be displayed on the upper part of the entire screen, and the second region 1002 may be displayed under the first region 1001 on the entire screen.

According to an embodiment, when the display of the electronic device 400 is reduced, a user interface may be changed such that contents separately provided in two or more visual object regions are provided within a single visual object region. For example, the text 1011, 1012, and 1014 separately provided in different bubble regions on the expanded display screen (a) may be merged by each sender on the reduced display screen (b), and the merged text may be displayed in a single object (e.g., the card 1021 or 1022). For example, on screen (b), the card 1021 may include the text 1011 and 1012 having been contained in different bubbles. For example, on screen (b), the card 1022 may include the text 1014 and emoji 1015 having been contained in different bubbles.

According to an embodiment, when contents separately provided in two or more visual object regions are provided in a single visual object region according to the reduction of the display, subordinate content to the corresponding content may also be provided within the single object region described above. For example, the text 1011 may include the reaction 1013, and on the reduced display screen (b), the reaction 1023 may be displayed in the region of the card 1021 including the text 1011. For example, the text 1014 may include a reaction 1016, and on the reduced display screen (b), the reaction 1026 may be displayed in the region of the card 1022 including the text 1014.

According to an embodiment, the size, position, and/or color of two or more content provided within the region of a single visual object 1021 or 1022 according to the reduction of the display may be changed based on characteristics of each content. For example, the text displayed in the single object 1021 may be positioned at the top and the size thereof may be maintained. For example, a reaction 1023 displayed in the single object 1021 may be displayed near (e.g., on the right side of) a target (e.g., text) designated by the corresponding reaction 1023. For example, when text (e.g., Hi~I'm BACK !!!) is designated as a target by the reaction 1023, the reaction 1023 may be displayed on the right side of the text as shown. For example, emojis 1025 and 1027 or reactions 1026 and 1028 displayed in the single object 1022 may be displayed near (e.g., under) a designated object (e.g., text).

Figure 10B:
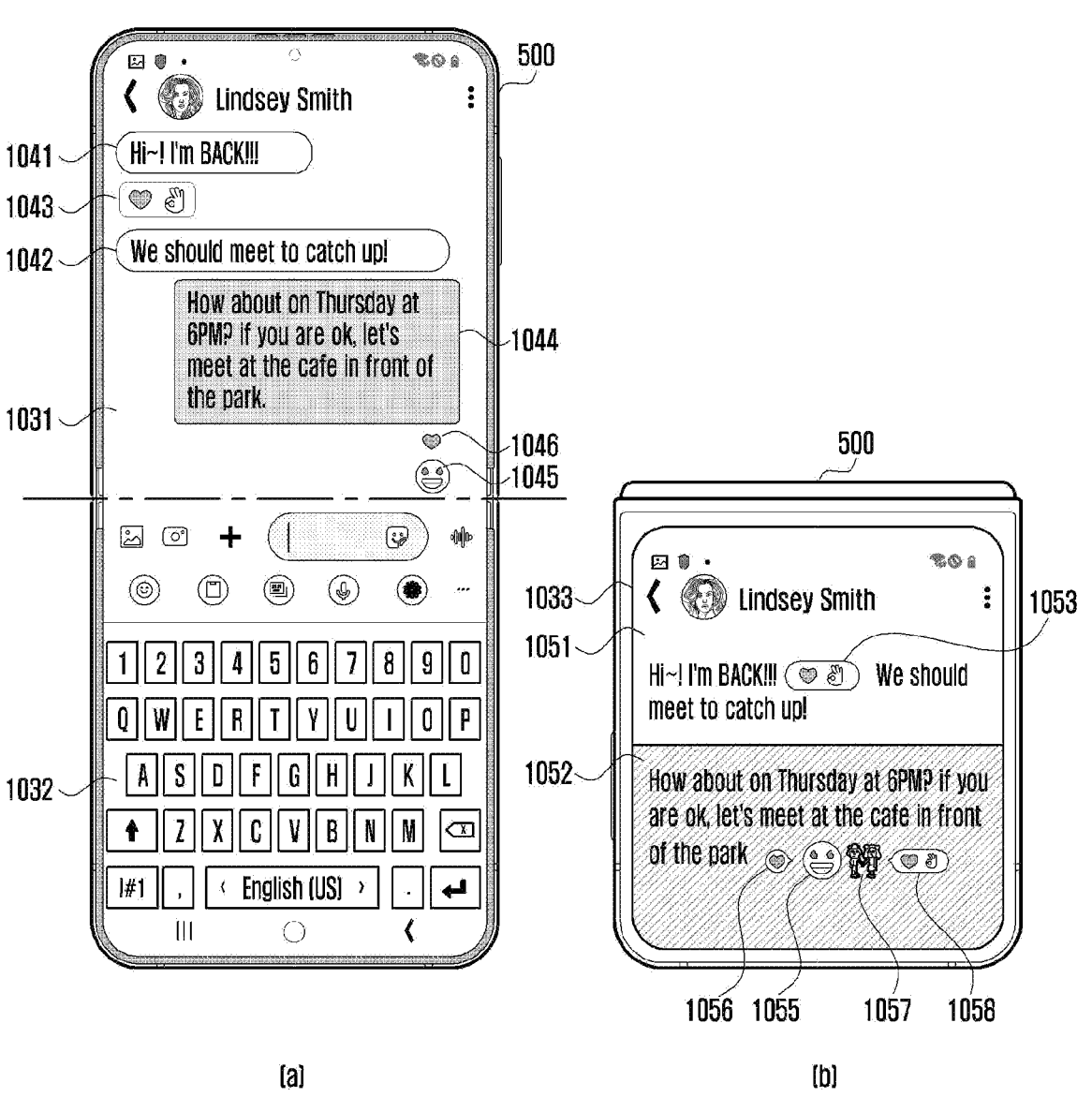
FIGS. 10B(a)-(b) illustrates examples of various user interfaces provided according to a state change of a display of an electronic device according to various example embodiments.

FIG. 10B illustrates examples of various user interfaces provided according to a state change of a display (e.g., the display 460 in FIG. 4) of an electronic device 500 (e.g., the electronic device 400 in FIG. 4) according to various embodiments. Hereinafter, detailed descriptions of contents overlapping those described with reference to the above drawings may be omitted.

According to various embodiments, the electronic device 500 may be implemented in a foldable structure as shown. For example, the flexible display 460 may be implemented as a main display region, and an upper display region 1031 and a lower display region 1032 may overlap each other according to the folding or unfolding of a foldable housing, whereby the flexible display 460 may be folded or unfolded. Referring to screen (a), a user interface may be provided through the upper display region 1031 and the lower display region 1032 of the flexible display 460 of the unfolded electronic device 500. Hereinafter, the upper display region 1031 and the lower display region 1032 has been described with an example of a structure in which the flexible display 460 is folded/unfolded vertically when the housing of the electronic device 500 is folded/unfolded vertically. However, various embodiments are not limited thereto, and may be applied, for example, to a structure in which the flexible display 460 is folded/unfolded left and right when the housing is folded/unfolded left and right.

According to various embodiments, the electronic device 500 may include an external display 1033 mounted on, directly or indirectly, a housing region (e.g., another surface corresponding to at least a portion of one surface on which the flexible display 460 is mounted) that is exposed to the outside when the flexible display 460 is folded and not exposed to the outside while the housing is folded.

According to various embodiments, referring to screen (b), when the housing of the electronic device 500 is folded, a changed user interface may be provided through the external display 1033.

According to various embodiments, when an application execution screen may be provided on a display screen when a specific application (e.g., a message application) is executed in the electronic device 500.

According to an embodiment, as shown in screen (a), the message application execution screen may be displayed on the first region (e.g., the upper display region 1031) according to the execution of the message application. For example, the message application execution screen may display each transmitted or received message content in a single object (e.g., a bubble).

According to an embodiment, incoming message bubbles 1041 and 1042, which may be displayed on the left side of the screen, and an outgoing message bubble 1044 may be displayed in order according to transmission or reception time points, respectively. The message bubbles may contain text and an emoji. For example, the message bubbles 1041, 1042, and 1044 may each include text. The bubble 1043 is subordinate to another bubble 1041 and may be a bubble representing a reaction to the message bubble 1041. The bubble 1045 may represent an emoji including an image expressing emotion.

According to an embodiment, the keyboard screen may be displayed in the second region (e.g., the lower display region 1032). For example, the keyboard screen may include text, numbers, a special character, an emoji selection button, an input option selection buttons, a configuration button, and/or various function selection buttons.

According to an embodiment, the first region 1031 may be displayed on the upper part of the entire screen, and the second region 1032 may be displayed under the first region 1031 of the entire screen.

According to an embodiment, when the flexible display, which is the main display of the electronic device 500, is folded and to be blocked from being exposed to the outside, the user interface may be changed and provided through the exposed external display 1033 such that the contents provided separately in two or more visual object regions are provided in a single visual object region. For example, the text 1041, 1042, and 1044 provided in different bubble regions on the main display screen (a) of the unfolded electronic device 500 may be merged by each sender on the external display screen (b) of the folded electronic device 500, and the merged text may be separately displayed within a single object (e.g., the card 1051 or 1052). For example, on screen (b), the card 1051 may include the text 1041 and 1042 having been contained in different bubbles. For example, on screen (b), the card 1052 may include the text 1044 and emoji 1045 having been contained in different bubbles.

According to an embodiment, when the contents having been separately provided in two or more visual object regions are provided in a single visual object region through the relatively small external display 1033 according to the folding of the electronic device 500, content subordinate to the corresponding content may also be provided within the single visual object region described above. For example, the text 1041 may include a reaction 1043, and on the relatively small external display screen (b), a reaction 1053 may be displayed in the region of the card 1051 containing the text 1041. For example, the text 1044 may include a reaction 1046, and on the external display screen (b), a reaction 1056 may be displayed in the region of the card 1052 containing the text 1044.

According to an embodiment, the size, position, and/or color of two or more content provided within the region of a single visual object 1051 or 1052 to be displayed in a small display due to the state change of the electronic device 500 may be changed based on characteristics of each content. For example, the text displayed in the single object 1051 may be positioned at the top and the size thereof may be maintained. For example, a reaction 1053 displayed in the single object 1051 may be displayed near (e.g., on the right side of) a target (e.g., text) designated by the corresponding reaction 1053. For example, when text (e.g., Hi~I'm BACK !!!) is designated as a target by the reaction 1053, the reaction 1053 may be displayed on the right side of the text as shown. For example, emojis 1055 and 1057 or reactions 1056 and 1058 displayed in the single object 1052 may be displayed near (e.g., under) a designated object (e.g., text). "Based on" as used herein covers based at least on.

Figure 10C:
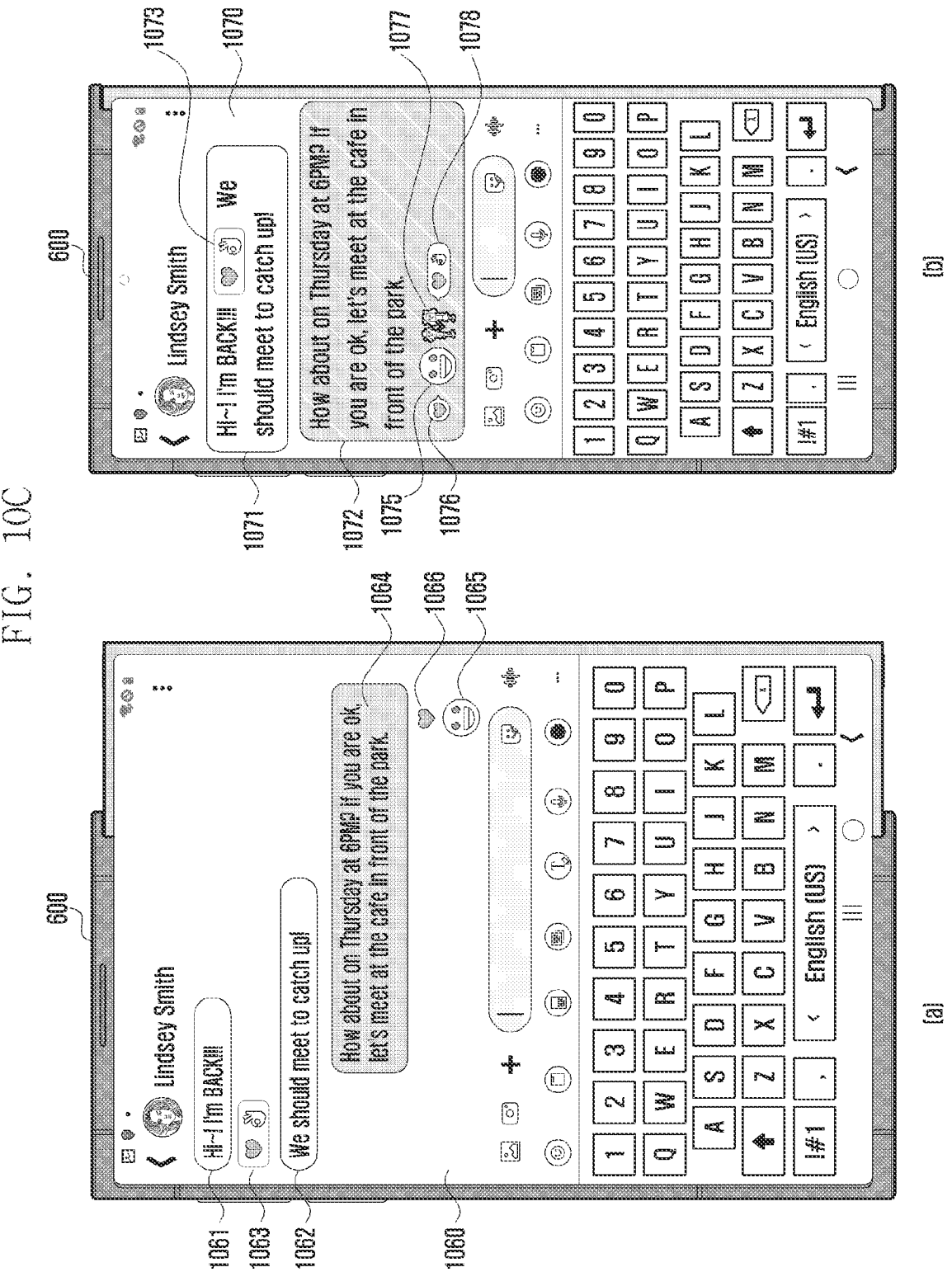
FIGS. 10C(a)-(b) illustrate examples of various user interfaces provided according to a state change of a display of an electronic device according to various example embodiments.

FIG. 10C illustrates examples of various user interfaces provided according to a state change of a display (e.g., the display 460 in FIG. 4) of an electronic device 600 (e.g., the electronic device 400 in FIG. 4) according to various embodiments. Hereinafter, detailed descriptions of contents overlapping those described with reference to the above drawings may be omitted.

According to various embodiments, as shown, the electronic device 600 may be implemented as a rollable structure in which a display region of a flexible display 460 is expanded or reduced by the horizontal sliding out or sliding in of the housing.

According to various embodiments, the electronic device 600 has a structure in which a housing is horizontally slid out or slid in, and as noted from screen (a), the electronic device 600 is in a state in which the flexible display 460 has an expanded display region 1060 according to the horizontal sliding out of the housing.

According to various embodiments, as noted from screen (b), the electronic device 600 is in a state in which the flexible display 460 is a reduced display region 1070 according to the horizontal sliding in of the housing.

According to various embodiments, an application execution screen may be provided on a display screen when a specific application (e.g., a message application) is executed on the electronic device 600.

According to an embodiment, as shown in screen (a), the message application execution screen may be displayed in the expanded display region 1060 according to the execution of the message application. For example, the message application execution screen may display each transmitted or received message content in a single object (e.g., a bubble).

According to an embodiment, incoming message bubbles 1061 and 1062, which may be displayed on the upper part of the screen, and an outgoing message bubble 1064 may be displayed in order according to transmission or reception time points, respectively. The message bubbles may contain text and an emoji. For example, the message bubbles 1061, 1062, and 1064 may each include text. The bubble 1063 is subordinate to another bubble 1061 and may be a bubble representing a reaction to the message bubble 1061. The bubble 1065 may represent an emoji including an image expressing emotion.

According to an embodiment, a keyboard screen may be displayed on the lower part of an application execution screen. For example, the keyboard screen may include text, numbers, a special character, an emoji selection button, an input option selection button, a configuration button, and/or various function selection buttons.

According to various embodiments, when the housing is slid in horizontally, the electronic device 600 may identify that the flexible display 460 is transitioned to have the reduced display region 1070 as shown in screen (b) from the state as in screen (a).

According to an embodiment, when the display of the electronic device 600 is reduced, a user interface may be changed such that contents separately provided in two or more visual object regions are provided in a single visual object region. For example, the text 1061, 1062, and 1064 separately provided in different bubble regions on the expanded display screen (a) may be merged by each sender on the reduced display screen (b), and the merged text may be separately displayed within a single object (e.g., the card 1071 or 1072). For example, on screen (b), the card 1071 may include the text 1061 and 1062 having been contained in different bubbles. For example, on screen (b), the card 1072 may include the text 1064 and emoji 1065 having been contained in different bubbles.

According to an embodiment, when the contents having been separately provided in two or more visual object regions are provided in a single visual object region according to the reduction of the display, content subordinate to the corresponding content may also be provided within the single visual object region described above. For example, the text 1061 may include a reaction 1063, and on the reduced display screen (b), a reaction 1073 may be displayed in the region of the card 1071 containing the text 1061. For example, the text 1064 may include a reaction 1066, and on the reduced display screen (b), a reaction 1076 may be displayed in the region of the card 1072 containing the text 1064.

According to an embodiment, the size, position, and/or color of two or more content provided within the region of a single visual object 1071 or 1072 according to the reduction of the display may be changed based on characteristics of each content. For example, the text displayed in the single object 1071 may be positioned at the top and the size thereof may be maintained. For example, a reaction 1073 displayed in the single object 1071 may be displayed near (e.g., on the right side of) a target (e.g., text) designated by the corresponding reaction 1073. For example, when text (e.g., Hi~I'm BACK !!!) is designated as a target by the reaction 1073, the reaction 1073 may be displayed on the right side of the text as shown. For example, emojis 1075 and 1077 or reactions 1076 and 1078 displayed in the single object 1072 may be displayed near (e.g., under) a designated object (e.g., text).

Figure 11:
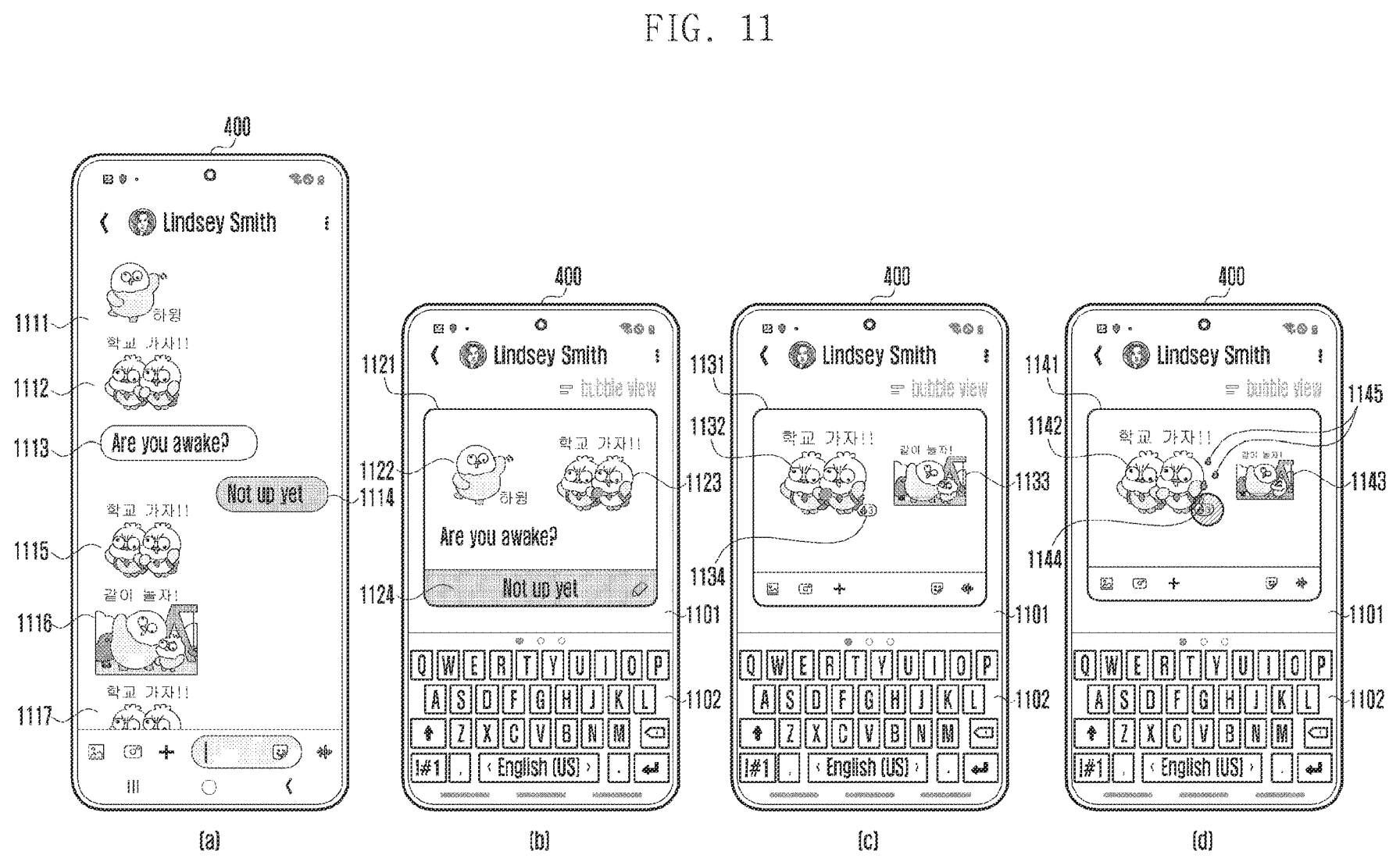

FIG. 11 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on the display screen when a specific application (e.g., a message application) is executed on the electronic device 400.

According to an embodiment, as shown in screen (a), when the message application is executed, the message application execution screen may be displayed in a first region 1101 (e.g., the first region 601 in FIG. 6). For example, the message application execution screen may display each transmitted or received message content in a single object (e.g., a bubble).

According to an embodiment, incoming message bubbles 1111, 1112, 1113, 1115, 1116, and 1117 may be displayed on the left side of the screen and an outgoing message bubble 1114 may be displayed on the right side of the screen, in order according to transmission or reception time points, respectively. The message bubbles may contain text and an emoji. For example, the message bubbles 1111 and 1114 may each include text. The bubbles 1111, 1112, 1115, 1116, and 1117 may represent emoticons or expressing text and/or an emoji or emoticon including an image.

According to an embodiment, contents separately provided in two or more visual object regions may be provided in a single visual object region according to the reduction of the display.

According to an embodiment, two or more visual objects may be displayed in a single card region by the same sender according to the reduction of the display. For example, the text 1113 and emojis 1111, 1112, 1115, 1116, 1117 on the expanded display screen (a), which are from the same sender, may be displayed as the text and emojis (e.g., emojis 1122, 1123, 1132, 1133, 1142, 1143) in a region of a single card 1121, 1131 or 1141 on screen (b), (c) or (d), respectively, according to the reduction of the display.

According to an embodiment, only one of the same contents having been repeated in the expanded display may be displayed when the display is reduced. For example, the emoticons 1112, 1115, and 1117 in the expanded display screen (a) may be displayed as an emoticon 1123 in the single card 1121 on the reduced display screen (b).

According to an embodiment, when the display is reduced, the size, position, and/or color of two or more contents provided within a region of a single visual object 1121 or 1124 may be changed based on characteristics of each content. For example, text displayed in a single object 1121 on the reduced display screen (b) may be positioned according to the reception order as for the other contents. For example, text may remain the same in size and an image may be reduced in size. For example, according to the number of identical contents repeated on the expanded display screen (a), the size of an object (e.g., the emoticon 1132) may be enlarged when displayed in the single object 1131 on the reduced display screen (c). For example, according to the number of identical contents repeated on the expanded display screen (a), an object (e.g., the emoticon 1143) corresponding to the less repetitive content 1116 (e.g., 1 time) may be reduced in size when displayed within the single object 1141 of the reduced display screen (d), compared to an object 1142 corresponding to the more repetitive contents 1112, 1115, and 1117 (e.g., 3 times). For example, according to the number of objects containing identical contents (e.g., the emoticons 1112, 1115, 1117), repeated on the expanded display screen (a), the number of repetitions (e.g., 3 times) for an object (e.g., the emoticon 1132) may be displayed within the single object 1131 of the reduced display screen (c) by displaying a subordinated object (e.g., the image and/or number 1134). For example, with respect to the object 1142 or the subordinated object 1144 indicating the number of times (e.g., 3 times) of the repeated object 1142 in the reduced display screen (d), a touch interaction 1145 may be displayed on or near the region of the corresponding object 1142 in response to a selection, for example touching.

According to an embodiment, a keyboard screen may be displayed in the second region 1102 (e.g., the second region 602 in FIG. 6). For example, the keyboard screen may include text, numbers, a special character, an emoji selection button, an input option selection button, a configuration button, and/or various function selection buttons.

Figure 12A:
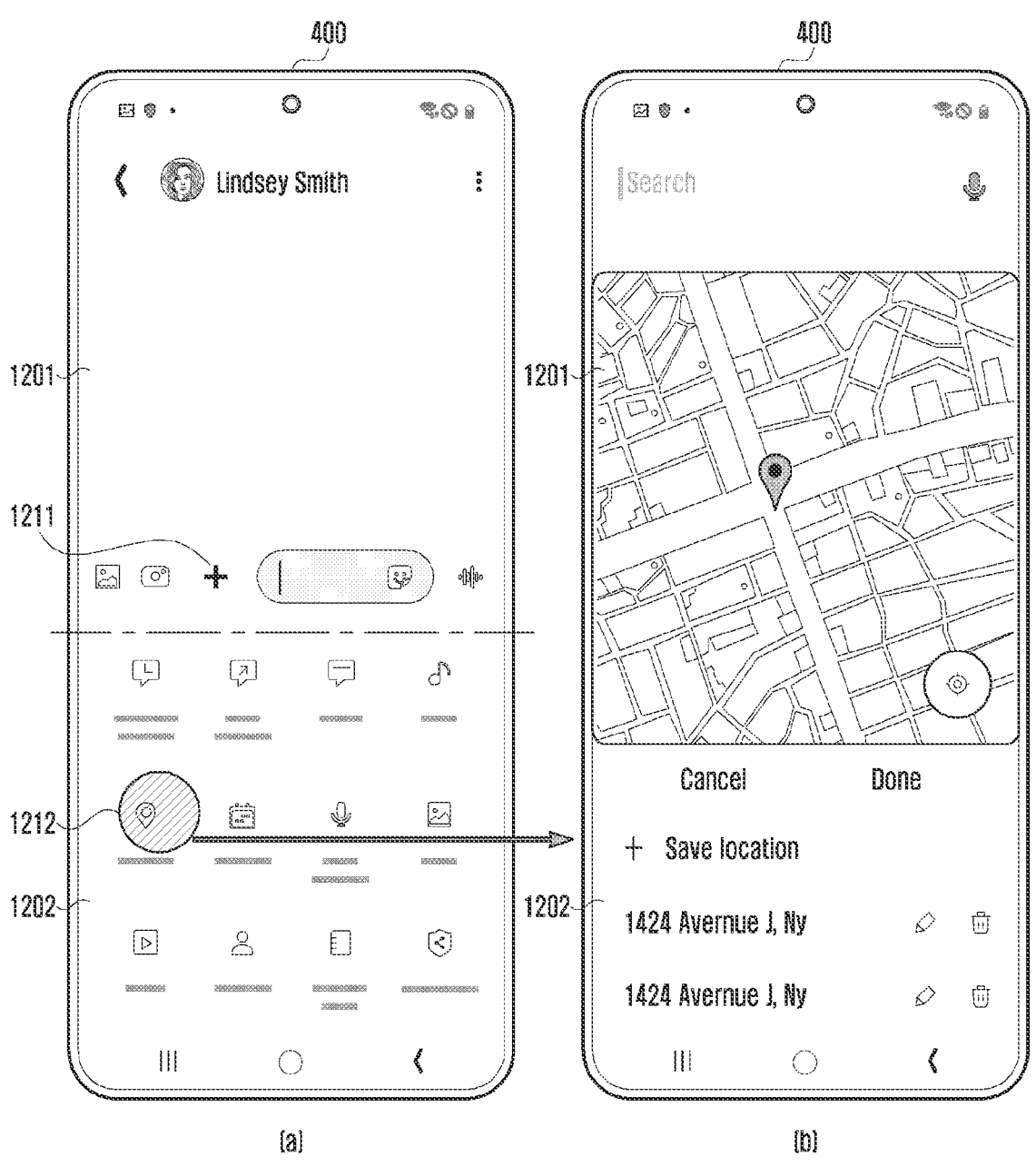
FIGS. 12A(a)-(b) illustrate examples of various user interfaces provided according to a state change of a display of an electronic device according to various example embodiments.
Figure 12B:
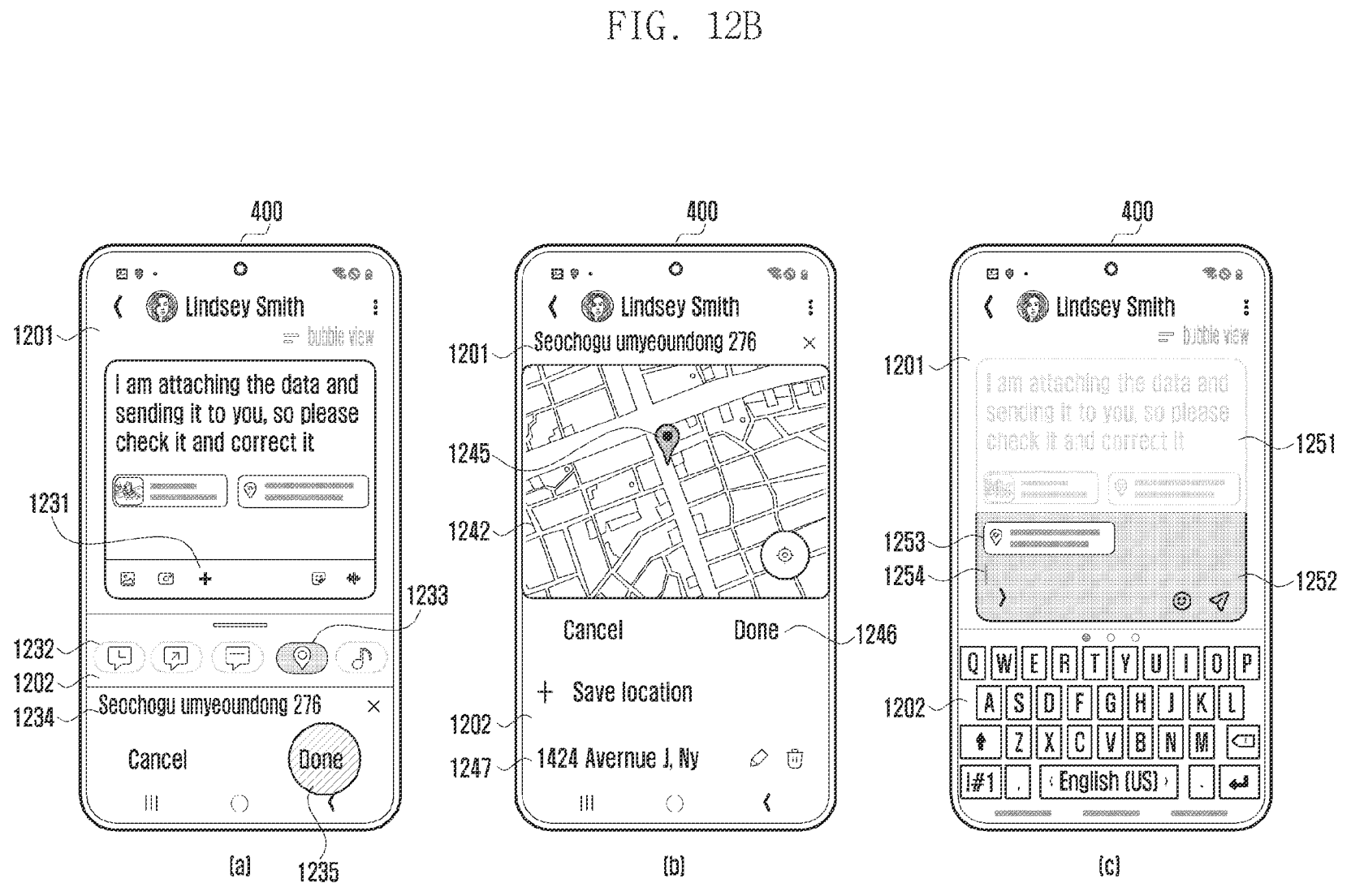

FIG. 12A illustrates examples of various user interfaces provided according to a state change of a display (e.g., the display 460 in FIG. 4) of an electronic device (e.g., the electronic device 400 in FIG. 4) according to various embodiments, and FIG. 12B illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on a display when a specific application (e.g., a message application) is executed on the electronic device 400.

In the example of FIG. 12A, a message application execution screen may be displayed in a first region 1201 when the message application is executed in the expanded display.

According to an embodiment, the first region 1201 may include a new message input window and/or various selectable objects (e.g., an existing image file attachment icon, a new image creation attachment icon, other attachment selection icons, an emoji selection icon, and/or a voice file creation attachment icon).

According to an embodiment, the second region 1202 may display various application icons for generating or selecting an attachment according to the selection of the attachment selection icon 1211 displayed on the first region 1201.

According to an embodiment, a map application may be executed as shown in screen (b) according to the selection of the application icon 1212 displayed in the second region 1202 on screen (a), and accordingly, a map indicating a specific location may be displayed in a portion of the first region 1201 and a portion of the second region 1202, and text indicating addresses of stored specific locations may be displayed in the second region 1202. When the selection of a specific location on screen (b) is completed, a map indicating the selected specific location may be attached to a message application as an attachment form and sent.

In the example of FIG. 12B, a message application execution screen may be displayed in a first region 1201 when the message application is executed in the reduced display.

According to an embodiment, the first region 1201 may include a new message input window and/or various selectable objects (e.g., an existing image file attachment icon, a new image creation attachment icon, other attachment selection icons, an emoji selection icon, and/or a voice file creation attachment icon).

According to an embodiment, according to the selection of an attachment selection icon 1231 displayed in the first region 1201, a toolbar 1232 displaying various application icons for generating or selecting an attachment may be displayed in at least a portion of the second region 1202.

According to an embodiment, when the toolbar 1232 is not able to display all application icons, icons that are not displayed may be displayed by, for example, a swipe method.

According to an embodiment, according to the selection of an application icon 1233 displayed on the toolbar 1232 in the second region 1202 on screen (a), an address 1234 of a specific location (e.g., a current location or a stored previous location) may be displayed in the second region 1202 of screen (a). When a done button 1235 is selected after the displayed address is confirmed, a map file for the displayed address may be attached to a message card 1252 as shown in screen (c).

According to an embodiment, when the address screen of the address displayed on screen (a) is enlarged, for example, using a scrolling method, a map screen 1242 may be displayed as shown in screen (b). A location 1245 selected on the displayed map screen 1242 may be changed, and the corresponding address 1247 may be displayed in the second region 1202. When a done button 1246 is selected after the selected location is confirmed, a map file 1253 indicating the selected location may be attached as shown in screen (c).

According to an embodiment, as shown in screen (c), when attaching a multimedia file such as an image, video, or audio file, an outgoing message writing window 1252 may be activated. For example, the outgoing message writing window 1252 may be displayed such that the color or transparency thereof is different from that of the incoming message card 1251. For example, the outgoing message writing window 1252 may be displayed in a dark color with low transparency, and the incoming message card 1251 may be displayed in a light color with high transparency. For example, a cursor 1254 may be displayed to be blinked in the outgoing message writing window 1252. For example, a keyboard screen may be displayed in the second region 1202.

Figure 13:
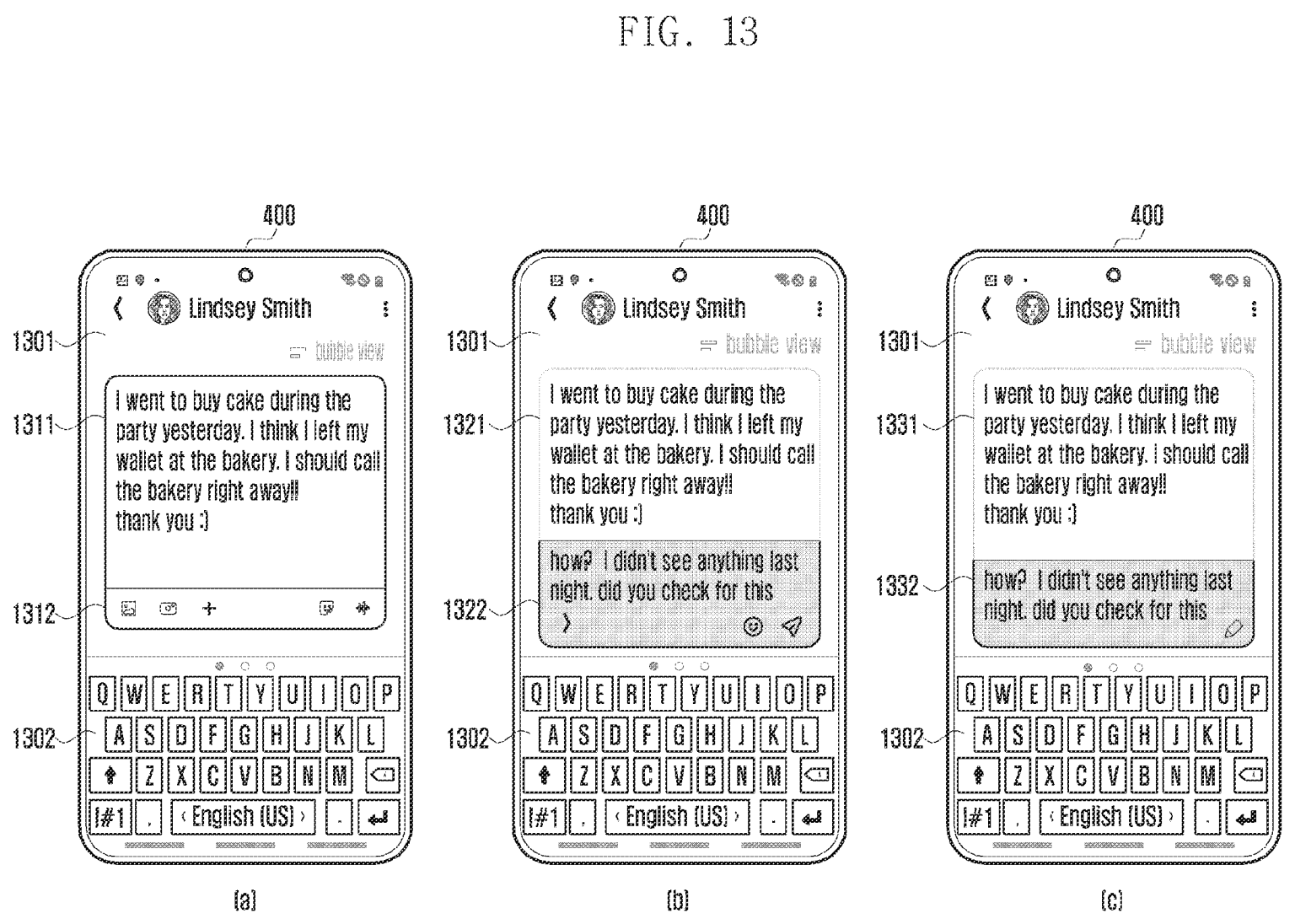

FIG. 13 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on a display when a specific application (e.g., a message application) is executed on the electronic device 400. Screens (a), (b) and (c) in FIG. 13 may represent screens displayed when the display of the electronic device 400 is reduced.

According to an embodiment, a message application execution screen may be displayed in a first region 1301 when the message application is executed in the reduced display.

According to an embodiment, a keyboard screen may be displayed in a second region 1302 of the reduced display. For example, the keyboard screen may include text, numbers, a special character, an emoji selection button, an input option selection button, a configuration button, and/or various function selection buttons.

According to an embodiment, the first region 1301 may display a card 1311 including a content of a received message. When there is a transmitted message, a card containing a content of the transmitted message may be displayed in the first region 1301.

According to an embodiment, the first region 1301 may include a new message input window and/or various selectable objects 1312 (e.g., an existing image file attachment icon, a new image creation attachment icon, other attachment selection icons, an emoji selection icon, and/or a voice file creation attachment icon).

According to an embodiment, when the keyboard screen is displayed in the second region 1302 via the new message input window displayed on the first region 1301 on screen (a), a new message may be written through the keyboard screen.

According to an embodiment, the height and/or color of the new message writing window in the first region 1301 may be variably changed according to a message writing state during new message writing. Accordingly, the new message writing state and the received or transmitted message may be clearly distinguished and recognized. For example, on screen (b), the outgoing new message writing window 1322 may be displayed such that the color or transparency thereof is different from that of the incoming message card 1321. For example, the new message writing window 1322 may be displayed in a dark color or gradation color with low transparency, and the incoming message card

1321 may be displayed in a light color with high transparency. For example, when the height of the text input through the new message writing window 1322 is higher than that of the new message writing window 1322, the recently input text may be displayed and the previously input text may be displayed by scrolling. For example, when the number of rows of text input through the new message window 1322 increases, the height of the new message window 1322 may be gradually increased, the height of the reception message card 1321 may be gradually decreased, and the transparency of the reception message card may be gradually increased.

According to an embodiment, when the outgoing message is completed and sent, the height and/or color of the outgoing message card 1332 and the incoming message card 1321/1331 on screen (c) may be changed.

According to an embodiment, when the outgoing message is completed and sent, the heights of the outgoing message card 1332 and the incoming message card 1321/1331 on screen (c) may be determined according to the number or amount of text included in each card. For example, on screen (c), the number or amount of text in the outgoing message card 1332 may be less than that of the incoming message card 1331. Accordingly, on screen (c), the height of the outgoing message card 1332 may be lower than that of the incoming message card 1331.

Figure 14:
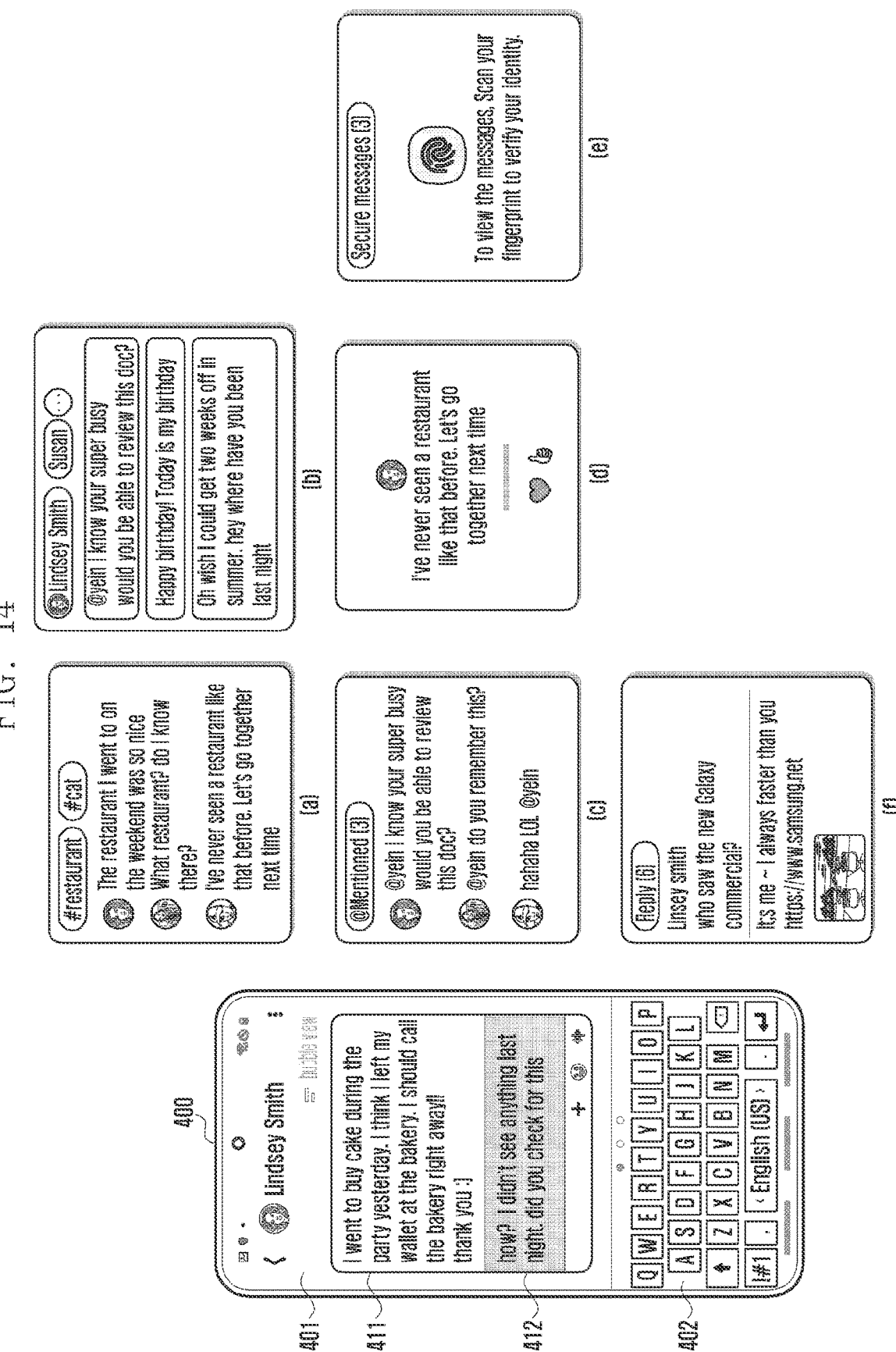
FIGS. 14(a)-(f) illustrate examples of various user interfaces provided according to a state change of a display of an electronic device according to various example embodiments.

FIG. 14 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on a display when a specific application (e.g., a message application) is executed on the electronic device 400. Screen (a) in FIG. 14 may represent a screen displayed when the display of the electronic device 400 is reduced.

According to an embodiment, when a message application is executed in the reduced display, a message application execution screen may be displayed in a first region 1401. For example, the application execution screen may display an incoming message card 1411 and an outgoing message card 1412. The incoming message card 1411 and the outgoing message card 1412 may be displayed to be different from each other in various morphological elements including the color, location, and/or transparency thereof.

According to an embodiment, a keyboard screen may be displayed in a second region 1402 of the reduced display. For example, the keyboard screen may include text, numbers, a special character, an emoji selection button, an input option selection button, a configuration button, and/or various function selection buttons.

According to an embodiment, messages of different categories or different characteristics (e.g., conversation topic, function, and sender) may be displayed according to an input (e.g., left and right swiping) on a message content region. For example, when a swipe input is performed on the regions of the incoming or outgoing message cards 1411 and 1412, the message content region may be changed to screen (a) showing messages containing a specific keyword (e.g., a restaurant or a cat), screen (b) showing messages received from the same sender (e.g., Susan), screen (c) showing messages in which a specific person (e.g., Yein) is mentioned, screen (d) showing messages with reactions, screen (e) showing confidential messages, or screen (f) showing reply messages. Accordingly, messages classified by specific standards may be provided to enable desired information to be found or collected and identified.

According to an embodiment, by selecting a message card on each screen (e.g., drag and drop), the selected card may be deleted or moved to a different turn.

Figure 15:
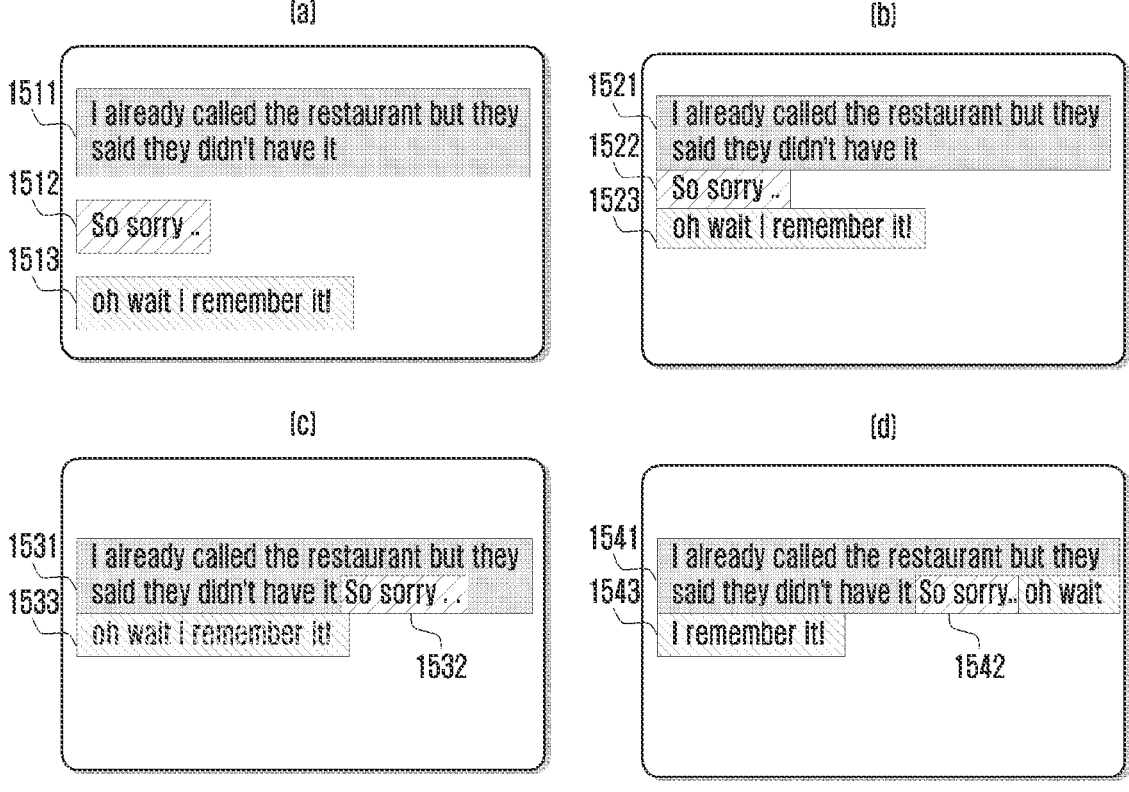
FIGS. 15(a)-(d) illustrate examples of various user interfaces provided according to a state change of a display of an electronic device according to various example embodiments.

FIG. 15 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on a display screen when a specific application (e.g., a message application) is executed on the electronic device 400.

According to an embodiment, screens (a), (b), (c), and (d) may represent message application execution screens displayed in a first region (e.g., the first region 601 in FIG. 6).

According to an embodiment, the display of the electronic device 400 may be gradually reduced while being transitioned from screen (a) to screen (d) via screen (b) and screen (c).

According to an embodiment, according to the reduction of the display, message bubbles 1511, 1512, and 1513 separately displayed on screen (a) may be displayed on screen (b) as the bubbles 1521, 1522, and 1523, boundaries of which overlap each other.

According to an embodiment, text rows of the message bubbles 1521, 1522, and 1523, boundaries of which are displayed to be in contact with each other in screen (b) according to the reduction of the display, vertically overlap each other in screen (c). Therefore, in screen (c), the message contents may be merged such that the message content in the bubble 1532 may be moved to a position behind the message content in the higher bubble 1531 on the same row.

According to an embodiment, in screen (d), the message contents (e.g., the messages 1531 and 1532) partially merged in screen (c) according to the reduction of the display and a part of the message content (e.g., the message 1533) not merged in screen (c) may be additionally merged such that another message content 1543 is additionally moved to a position behind the message contents 1541 and 1542 on the same row.

According to an embodiment, each of the message contents to be merged may be displayed to be distinguished from each other within a single card by varying characteristics such as color and/or highlight.

According to an embodiment, the message contents to be merged may be messages sent by the same person, but are not limited thereto, and may also include messages sent by different senders. In this case, the message contents within the single card may be displayed to be distinguished from each other by varying characteristics such as color and/or highlight.

Figure 16:
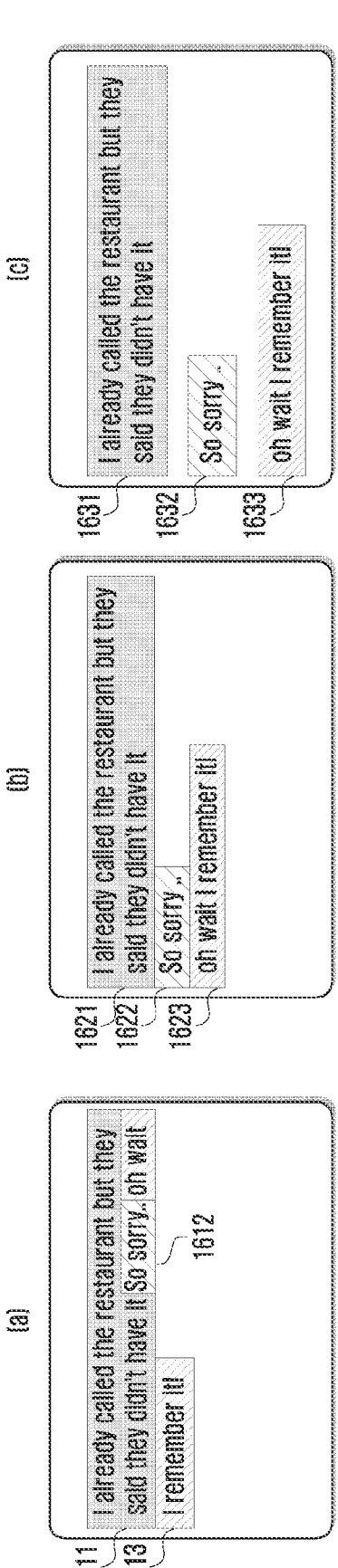
FIGS. 16(a)-(c) illustrate examples of various user interfaces provided according to a state change of a display of an electronic device according to various example embodiments.

FIG. 16 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on a display screen when a specific application (e.g., a message application) is executed on the electronic device 400.

According to an embodiment, screens (a), (b), and (c) may represent message application execution screens displayed in a first region (e.g., the first region 601 in FIG. 6).

According to an embodiment, the display of the electronic device 400 may be gradually expanded while being transitioned from screen (a) to screen (c) via screen (b).

According to an embodiment, according to the expansion of the display, the message contents 1611, 1612, and 1613 merged on screen (a) may undergo line-break and be displayed on screen (b) as separate bubbles 1621, 1622, and 1623, boundaries of which are in contact with each other.

According to an embodiment, the message bubbles 1621, 1622, and 1623, boundaries of which are displayed to be in contact with each other in screen (b) according to the expansion of the display may be separated from each other according to the further expansion of the display while causing a gap between the bubbles to be widen, and accordingly, the message bubbles 1621, 1622, and 1623 may be displayed on screen (c) as separate bubbles 1631, 1632, and 1633 separated from each other.

Figure 17:
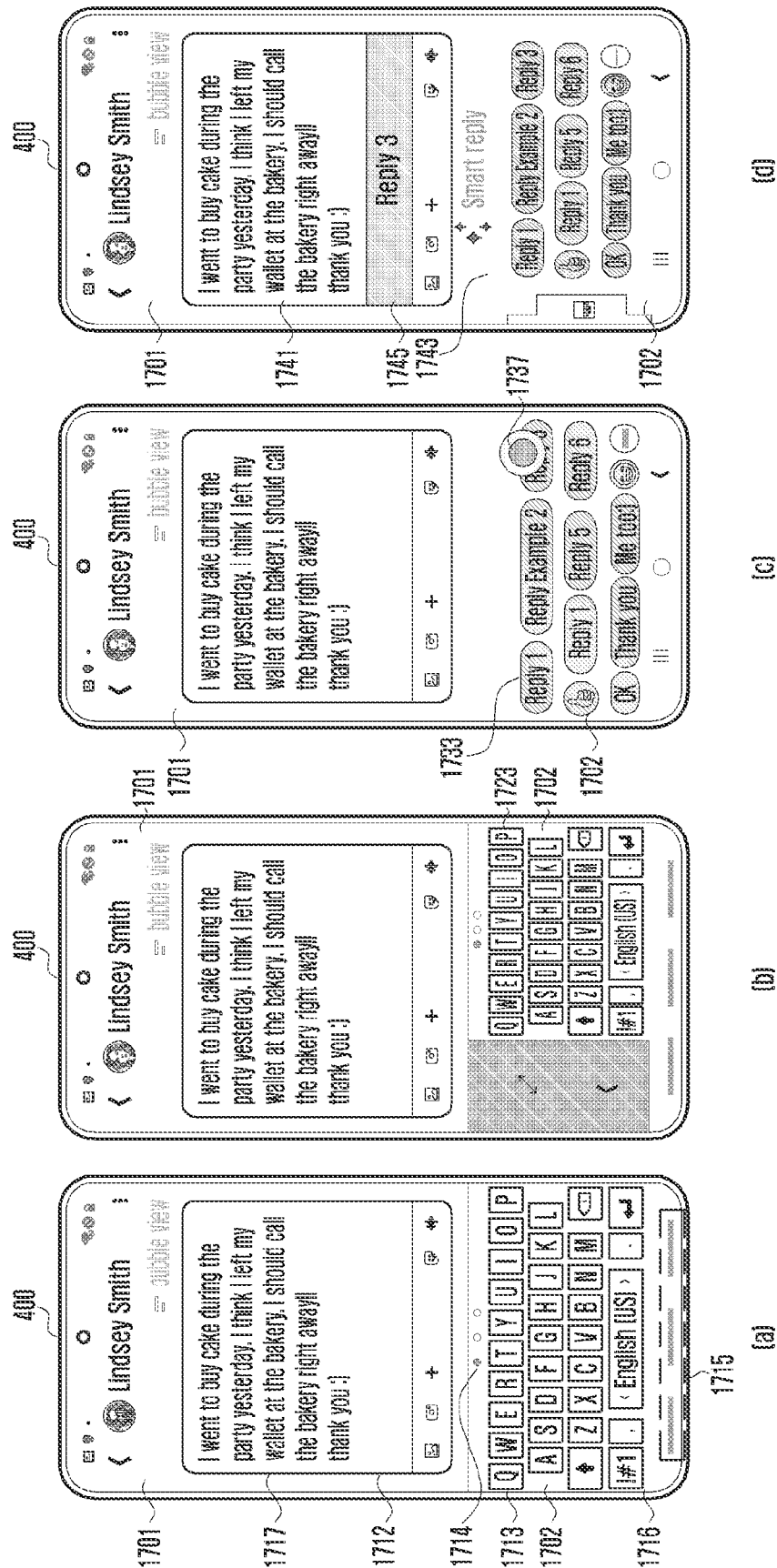
FIGS. 17(a)-(d) illustrate examples of various user interfaces provided according to a state change of a display of an electronic device according to various example embodiments.

FIG. 17 illustrates examples of various user interfaces provided according to a state change of a display (e.g., the display 460 in FIG. 4) of an electronic device (e.g., the electronic device 400 in FIG. 4) according to various embodiments. Hereinafter, detailed descriptions of contents overlapping those described with reference to the above drawings may be omitted.

According to various embodiments, an application execution screen may be provided on a display screen when a specific application (e.g., a message application) is executed on the electronic device 400.

According to an embodiment, when the message application is executed, on the reduced display screen (a), a message application execution screen may be displayed in a first region 1701 (e.g., the first region 601 in FIG. 6) and a keyboard screen may be displayed in the second region 1702 (e.g., the second region 602 in FIG. 6) for various inputs.

Each embodiment herein may be used in combination with any other embodiment(s) described herein.

According to an embodiment, a keyboard screen having a reduced height relative to a keyboard screen in an expanded state may be provided on the reduced display screen (a). For example, the heights of selectable objects (e.g., buttons or keys 1713) on the keyboard screen may be reduced. For example, the height of the buttons of a navigation bar 1715 may be reduced.

According to an embodiment, some selectable objects included in the keyboard screen in an expanded state may be removed and may not be provided on the reduced display screen (a). For example, the keyboard screen may provide a number input button along with a special character when a special character button 1716 is selected, without displaying a number button.

According to an embodiment, a received message content on the message application execution screen displayed in the first region 1701 may be displayed in a single object 1717 (e.g., a card).

According to an embodiment, the first region 1701 may include a new message input window and/or various selectable objects (e.g., an existing image file attachment icon, a new image creation attachment icon, other attachment selection icons, an emoji selection icon, and/or a voice file creation attachment icon).

According to an embodiment, for example, according to a swipe input for a selectable object 1714 (e.g., a toolbar) in the second region 1702 provided on the expanded display, for example, one of various selectable objects 716 (e.g., an emoji input icon, a voice input icon, a keyboard configuration icon, a search icon, and/or various function selection icons) in FIG. 7, which are omitted from the display, may be displayed in the second region 1702.

According to an embodiment, FIG. 17 shows input methods to be used on the reduced display screen, and screen (a) may represent a normal keyboard method, screen (b) may represent a one-handed keyboard method, and screens (c) and (d) may represent smart keyboards. For example, the widths of selectable objects (e.g., buttons or keys 1723) on the one-handed keyboard method screen (c) may be reduced.

According to an embodiment, a keyboard input method provided according to the size reduction of the display may be provided in a predetermined method (e.g., a general keyboard method of screen (a)).

According to an embodiment, a keyboard input method provided according to the size reduction of the display may be provided according to a user's selection as described above with reference to FIG. 7.

According to an embodiment, a keyboard input method of a display may be changed. For example, the keyboard method of a display may be changed according to a specific input (e.g., a long press on the keyboard screen in the second region 1702). For example, screen (a) or screen (b) may be changed to screen (c) according to a long press on the second region 1702 thereof. For example, screen (d) may be changed to screen (a) or screen (b) according to a long press on the second region 1743 thereof.

According to an embodiment, according to the smart input method on screen (c), a reply text button 1733 and/or emojis provided by the smart input of the second region may be provided in response to the contents (e.g., a keyword) included in the message card displayed in the first region 1701.

According to an embodiment, when a reply text button 1737 provided on screen (c) is selected, the selected reply text may be input and displayed on a transmission message card 1745 in the first region 1701 on screen (d). As the transmitted message card 1745 has been displayed, a size (e.g., height) of a reception message card 1741 may be reduced.

The embodiments disclosed in this document are merely presented as examples to easily explain technical content and help understanding, and are not intended to limit the scope of the technology disclosed in this document. Therefore, the scope of the various embodiments in this document should be interpreted that, in addition to the example embodiments, all changes or modifications derived from the technical ideas of the various embodiments in this document are included herein. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a housing including a first housing part and a second housing part configured to movably engage with the first housing part between a retracted position and an extended position;
   a flexible display coupled to the first housing part and the second housing part such that a size of an area of the flexible display that is visible from a front side of the housing changes as the second housing part is moved between the retracted position and the extended position; and
   a memory storing instructions that, when executed by a processor, cause the electronic device to:
      while the second housing part is in the extended position, display, on a first area of the flexible display visible from the front side, a first message bubble and a second message bubble;
      while the first message bubble and the second message bubble are displayed on the flexible display, identify that the second housing part is moved from the extended position to the retracted position; and
      based on the second housing part being moved from the extended position to the retracted position, display, on a second area of the flexible display visible from the front side, a combined message bubble by including a content of the first message bubble and a content of the second message bubble,
      wherein a size of the second area of the flexible display is smaller than a size of the first area of the flexible display.

2. The electronic device of claim 1, wherein a content of each of the first and second message bubbles comprise at least one of texts, images, emoticons, emojis or files, and
   wherein a vertical distance between a top edge of the first message bubble to a bottom edge of the second message bubble while the housing is in the extended position is greater than a vertical distance between a top edge of the combined message bubble to a bottom edge of the combined message bubble while the housing is in the retracted position.

3. The electronic device of claim 1, wherein the instructions, when executed by the processor, further cause the electronic device to:
   based on the second housing part being moved from the extended position to the retracted position, merge the first and second message bubbles into the combined message bubble having a width substantially corresponding to a width of an execution screen of a message application, the combined message bubble displaying texts included in the first and second message bubbles,
   wherein the width of the combined message bubble is greater than a width of the first message bubble and a width of the second message bubble.

4. The electronic device of claim 1, wherein the instructions, when executed by the processor, further cause the electronic device to:
   while the second housing part is in the extended position, display, on the first area of the flexible display visible from the front side, a plurality of message bubbles originating from a sender and a plurality of message bubbles originating from a user of the electronic device; and
   based on the second housing part being moved from the extended position to the retracted position, display, on the second area of the flexible display visible from the front side, a first combined message bubble by merging contents of the plurality of message bubbles originating from the sender and a second combined message bubble by merging contents of the plurality of message bubbles originating from the user of the electronic device such that two or more message bubbles originating from an identical source are grouped and contents thereof are merged into a respective combined message bubble.

5. The electronic device of claim 1, wherein the instructions, when executed by the processor, further cause the electronic device to:

while the combined message bubble is displayed on the flexible display, identify that the second housing part is moved from the retracted position to the extended position; and based on the second housing part being moved from the retracted position to the extended position, display, on the first area of the flexible display visible from the front side, the first message bubble and the second message bubble by separating the content of the first message bubble and the content of the second message bubble from a content of the combined message bubble.

6. The electronic device of claim 1, wherein a content of each of the first and second message bubbles comprises at least one of texts, images, emoticons, emojis or files, and wherein the at least one of the texts, images, emoticons, emojis or files are arranged in an identical row of the combined message bubble.

7. The electronic device of claim 1, wherein a content of each of the first and second message bubbles comprises at least one of texts, images, emoticons, emojis or files, and wherein a plurality of identical text, image, emoticon, emojis or file, among the at least one of the texts, the images, the emoticons, the emojis or the files separately provided in the first and second message bubbles, are displayed as one identical text, image, emoticon, emojis or file in the combined message bubble.

8. The electronic device of claim 1, wherein the instructions, when executed by the processor, further cause the electronic device to:

identify a third message bubble which provides reaction to the first or second message bubble; and based on the second housing part being moved from the extended position to the retracted position, merge the third message bubble into the combined message bubble.

9. The electronic device of claim 1, wherein a height of the combined message bubble is adjusted in accordance with an amount of the content of the first message bubble and the content of the second message bubble.

10. An electronic device comprising:

a housing including a first housing part and a second housing part configured to movably engage with the first housing part between a retracted position and an extended position;

a flexible display coupled to the first housing part and the second housing part such that a size of an area of the flexible display that is visible from a front side of the housing changes as the second housing part is moved between the retracted position and the extended position;

a processor; and a memory storing instructions that, when executed by the processor, cause the electronic device to:

while the second housing part is in the extended position, display, on a first area of the flexible display visible from the front side, a first message bubble and a second message bubble;

while the first message bubble and the second message bubble are displayed on the flexible display, identify that the second housing part is moving from the extended position to the retracted position; and based on identifying that the second housing part is moving from the extended position to the retracted position, display, on a second area of the flexible display visible from the front side, a combined message bubble by including a content of the first message bubble and a content of the second message bubble, wherein a size of the second area of the flexible display is smaller than a size of the first area of the flexible display.

11. The electronic device of claim 10, wherein the instructions, when executed by the processor, further cause the electronic device to:

while the second housing part is moving from the extended position to the retracted position, merge texts included in the first message bubble and texts included in the second message bubble by gradually decreasing a spacing between the texts included in the first message and the texts included in the second message bubble.

12. The electronic device of claim 11, wherein the instructions, when executed by the processor, further cause the electronic device to:

based on identifying that the second housing part is moving to the retracted position, place the texts included in the first message bubble and the texts included in the second message bubble in an identical row of the combined message bubble.

13. A method of an electronic device having a housing including a first housing part and a second housing part configured to movably engage with the first housing part between a retracted position and an extended position, the method comprising:

while the second housing part is in the extended position, displaying, on a first area of a flexible display of the electronic device visible from a front side of the housing, a first message bubble and a second message bubble;

while the first message bubble and the second message bubble are displayed on the flexible display, identifying that the second housing part is moved from the extended position to the retracted position; and based on the second housing part being moved from the extended position to the retracted position, displaying, on a second area of the flexible display visible from the front side, a combined message bubble by including a content of the first message bubble and a content of the second message bubble, wherein a size of the second area of the flexible display is smaller than a size of the first area of the flexible display.

14. The method of claim 13, wherein a content of each of the first and second message bubbles comprising at least one of texts, images, emoticons, emojis or files, and wherein a vertical distance between a top edge of the first message bubble to a bottom edge of the second message bubble while the housing is in the extended position is greater than a vertical distance between a top edge of the combined message bubble to a bottom edge of the combined message bubble while the housing is in the retracted position.

15. The method of claim 13, wherein the method further comprises:

based on the second housing part being moved from the extended position to the retracted position, merging the first and second message bubbles into the combined message bubble having a width substantially corresponding to a width of an execution screen of a message application, the combined message bubble displaying texts included in the first and second message bubbles, wherein the width of the combined message bubble is greater than a width of the first message bubble and a width of the second message bubble.

16. The method of claim 13, wherein the method further comprises:

while the second housing part is in the extended position, displaying, on the first area of the flexible display visible from the front side, a plurality of message bubbles originating from a sender and a plurality of message bubbles originating from a user of the electronic device; and based on the second housing part being moved from the extended position to the retracted position, displaying, on the second area of the flexible display visible from the front side, a first combined message bubble by merging contents of the plurality of message bubbles originating from the sender and a second combined message bubble by merging contents of the plurality of message bubbles originating from the user of the electronic device such that two or more message bubbles originating from an identical source are grouped and contents thereof are merged into a respective combined message bubble.

17. The method of claim 13, wherein the method further comprises:

while the combined message bubble is displayed on the flexible display, identifying that the second housing part is moved from the retracted position to the extended position; and based on the second housing part being moved from the retracted position to the extended position, displaying, on the first area of the flexible display visible from the front side, the first message bubble and the second message bubble by separating the content of the first message bubble and the content of the second message bubble from a content of the combined message bubble.

18. The method of claim 13, wherein a content of each of the first and second message bubbles comprising at least one of texts, images, emoticons, emojis or files, and wherein the at least one of the texts, images, emoticons, emojis or files are arranged in an identical row of the combined message bubble.

19. The method of claim 13, wherein a content of each of the first and second message bubbles comprising at least one of texts, images, emoticons, emojis or files, and wherein a plurality of identical text, image, emoticon, emojis or file, among the at least one of the texts, the images, the emoticons, the emojis or the files separately provided in the first and second message bubbles, are displayed as one identical text, image, emoticon, emojis or file in the combined message bubble.

20. The method of claim 13, wherein the method further comprises:

identifying a third message bubble which provides reaction to the first or second message bubble; and based on the second housing part being moved from the extended position to the retracted position, merging the third message bubble into the combined message bubble.

\* \* \* \* \*